(12) United States Patent
Shiga et al.

(10) Patent No.: US 10,661,124 B2
(45) Date of Patent: *May 26, 2020

(54) GOLF BALL RESIN COMPOSITION AND GOLF BALL

(71) Applicant: SUMITOMO RUBBER INDUSTRIES, LTD., Kobe-shi, Hyogo (JP)

(72) Inventors: Kazuyoshi Shiga, Kobe (JP); Masanori Taguchi, Kobe (JP); Takahiro Shigemitsu, Kobe (JP); Hiroshi Tadaoka, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 17 days.

This patent is subject to a terminal disclaimer.

(21) Appl. No.: 16/106,411

(22) Filed: Aug. 21, 2018

(65) Prior Publication Data

US 2018/0353814 A1    Dec. 13, 2018

Related U.S. Application Data

(62) Division of application No. 14/754,180, filed on Jun. 29, 2015, now abandoned.

(30) Foreign Application Priority Data

| Jun. 30, 2014 | (JP) | .................. | 2014-135410 |
| Jun. 30, 2014 | (JP) | .................. | 2014-135411 |
| Dec. 26, 2014 | (JP) | .................. | 2014-266655 |
| May 21, 2015 | (JP) | .................. | 2015-103870 |
| May 21, 2015 | (JP) | .................. | 2015-103871 |

(51) Int. Cl.

| *A63B 37/00* | (2006.01) |
| *C08L 23/08* | (2006.01) |
| *C08K 7/04* | (2006.01) |
| *C08K 9/04* | (2006.01) |
| *C08K 5/17* | (2006.01) |
| *C08K 5/09* | (2006.01) |
| *C08K 3/22* | (2006.01) |
| *C08K 3/36* | (2006.01) |
| *C08K 7/02* | (2006.01) |
| *C08K 3/04* | (2006.01) |
| *C08K 3/08* | (2006.01) |

(52) U.S. Cl.
CPC ...... *A63B 37/0049* (2013.01); *A63B 37/0039* (2013.01); *A63B 37/0043* (2013.01); *A63B 37/0075* (2013.01); *C08K 3/041* (2017.05); *C08K 3/042* (2017.05); *C08K 3/045* (2017.05); *C08K 3/22* (2013.01); *C08K 3/36* (2013.01); *C08K 5/09* (2013.01); *C08K 5/175* (2013.01); *C08K 7/02* (2013.01); *C08K 9/04* (2013.01); *C08L 23/0869* (2013.01); *C08K 2003/0812* (2013.01); *C08K 2003/2206* (2013.01); *C08K 2003/2224* (2013.01); *C08K 2003/2227* (2013.01); *C08K 2003/2296* (2013.01); *C08K 2201/003* (2013.01); *C08K 2201/004* (2013.01); *C08K 2201/016* (2013.01)

(58) Field of Classification Search
None
See application file for complete search history.

(56) References Cited

U.S. PATENT DOCUMENTS

| 5,150,905 A | 9/1992 | Yuki et al. | |
| 6,106,415 A | 8/2000 | Masutani et al. | |
| 9,987,522 B2* | 6/2018 | Shiga .................. | A63B 37/0087 |
| 10,195,488 B2* | 2/2019 | Shiga .................. | A63B 37/0039 |
| 2001/0006998 A1 | 7/2001 | Takesue et al. | |
| 2004/0048688 A1 | 3/2004 | Hogge et al. | |
| 2004/0092336 A1 | 5/2004 | Kim et al. | |
| 2005/0020385 A1 | 1/2005 | Onoda et al. | |
| 2005/0059509 A1 | 3/2005 | Takesue et al. | |
| 2006/0270790 A1 | 11/2006 | Comeau | |
| 2008/0096693 A1 | 4/2008 | Boehm et al. | |
| 2009/0298994 A1 | 12/2009 | Dubois et al. | |
| 2011/0082245 A1* | 4/2011 | Iizuka .................. | C08L 23/0869 524/322 |
| 2011/0124793 A1 | 5/2011 | Shimizu et al. | |
| 2013/0079178 A1* | 3/2013 | Shiga .................. | A63B 37/0039 473/371 |

(Continued)

FOREIGN PATENT DOCUMENTS

| JP | 2004-504900 A | 2/2004 |
| JP | 2004-351034 A | 12/2004 |
| JP | 2005-46613 A | 2/2005 |

(Continued)

*Primary Examiner* — David J Buttner

(74) *Attorney, Agent, or Firm* — Birch, Stewart, Kolasch & Birch, LLP

(57) ABSTRACT

An object of the present invention is to provide a golf ball exhibiting an excellent shot feeling and resilience, and a constituent material thereof. The present invention provides a golf ball resin composition having a bending stiffness ($M_{3-12}$) ranging from 300 kgf/cm² to 24,000 kgf/cm² at a bending angle from 3° to 12°, a ratio ($M_{3-12}/M_{24-30}$) of the bending stiffness ($M_{3-12}$) at the bending angle from 3° to 12° to a bending stiffness ($M_{24-30}$) at a bending angle from 24° to 30° ranging from 0.20 to 2.00, and a slab hardness ranging from 30 to 65 in Shore D hardness.

20 Claims, 3 Drawing Sheets

(56) References Cited

U.S. PATENT DOCUMENTS

2015/0057103 A1\* 2/2015 Shiga ...................... C08K 3/22
  473/373

FOREIGN PATENT DOCUMENTS

| JP | 2006-43447 A | 2/2006 |
| JP | 2006-95286 A | 4/2006 |
| JP | 2011-87958 A | 5/2011 |
| JP | 2013-208505 A | 10/2013 |
| JP | 2015039543 | \* 3/2015 |

\* cited by examiner

GOLF BALL RESIN COMPOSITION AND GOLF BALL

CROSS REFERENCE TO RELATED APPLICATIONS

This application is a Divisional of application Ser. No. 14/754,180 filed on Jun. 29, 2015 now abandoned, which is claims priority under 35 U.S.C. § 119(a) to Japanese Application No. 2015-103871, filed on May 21, 2015; Japanese Application No. 2015-103870, filed on May 21, 2015; Japanese Application No. 2014-266655, filed on Dec. 26, 2014; Japanese Application No. 2014-135411, filed on Jun. 30, 2014; and Japanese Application No. 2014-135410, filed on Jun. 30, 2014, all of which are hereby expressly incorporated by reference into the present application.

FIELD OF THE INVENTION

The present invention relates to a golf ball resin composition and a golf ball using the golf ball resin composition.

DESCRIPTION OF THE RELATED ART

As a resin component constituting a cover, intermediate layer or the like of a golf ball, a thermoplastic resin such as an ionomer resin and a polyurethane resin is used. The ionomer resin exhibits high stiffness, when used as a constituent member of the golf ball, the golf ball traveling a long distance is obtained. Thus, the ionomer resin is widely used as a material of the intermediate layer or cover constituting the golf ball (for example, Japanese Patent Publication No. 2011-087958 A, and No. 2013-208505 A). The polyurethane resin is soft, when used as the cover of the golf ball, the golf ball excellent in spin performance and shot feeling is obtained.

In recent years, a method of blending, in addition to the resin component, a filler such as an organic short fiber, metal or clay mineral into the constituent member of the golf ball to improve the golf ball performance, is proposed. For example, Japanese Patent Publication No. 2006-043447 A discloses a golf ball having a core and an outer layer part wrapping the core, wherein the outer layer part is formed from a resin composition containing a cation-treated layered silicate in a resin matrix.

Japanese Patent Publication No. 2006-095286 A discloses a golf ball having a core, an intermediate layer covering the core, and a cover covering the intermediate layer, wherein the intermediate layer is formed from a resin composition containing a cation-treated layered silicate.

Japanese Patent Publication No. 2004-504900 A discloses a golf ball comprising a nanocomposite material, wherein the nanocomposite material comprises a polymer having a structure in which particles of inorganic material are reacted and substantially evenly dispersed, and wherein each particle has a largest particle diameter that is about one micron or less and is at least an order of magnitude greater than such particle's smallest particle diameter.

Japanese Patent Publication No. 2004-351034 A discloses a high strength golf ball having a core, at least one intermediate layer formed on the outer side of the core, and at least one cover layer formed on the outer side of the intermediate layer, wherein a carbon nanotube is comprised in the core and at least one layer of the intermediate layer.

Japanese Patent Publication No. 2005-46613 A discloses a golf ball having a core, a barrier layer enveloping the core, and a cover enveloping the barrier layer, wherein the barrier layer has a moisture vapor permeability lower than that of the cover, and is formed from a thermoplastic or thermosetting composition in which microparticles are dispersed in a binder comprising a synthetic rubber, natural rubber, polyolefin, styrene polymer or single-site catalyzed polymer.

SUMMARY OF THE INVENTION

The golf ball comprising a constituent member in which the above-described filler is comprised exhibits high resilience, however, the shot feeling thereof is lowered. In other words, if the stiffness of the constituent member of the golf ball is increased in order to increase the resilience, the shot feeling is lowered. Thus, it is difficult for the conventional golf ball resin composition to strike a good balance between shot feeling and resilience.

The present invention has been achieved in view of the above problems. An object of the present invention is to provide a golf ball material imparting an excellent shot feeling and resilience to a golf ball, and a golf ball formed from the golf ball material.

The first golf ball resin composition according to the present invention has a bending stiffness ($M_{3-12}$) ranging from 300 kgf/cm² to 24,000 kgf/cm² at a bending angle from 3° to 12°, a ratio ($M_{3-12}/M_{24-30}$) of the bending stiffness ($M_{3-12}$) at the bending angle from 3° to 12° to a bending stiffness ($M_{24-30}$) at a bending angle from 24° to 30° ranging from 0.20 to 2.00, and a slab hardness ranging from 30 to 65 in Shore D hardness.

The second golf ball resin composition according to the present invention has a bending stiffness ($M_{3-12}$) ranging from 300 kgf/cm² to 24,000 kgf/cm² at a bending angle from 3° to 12°, a ratio ($M_{12-15}/M_{36-39}$) of a bending stiffness ($M_{12-15}$) at a bending angle from 12° to 15° to a bending stiffness ($M_{36-39}$) at a bending angle from 36° to 39° ranging from 0.20 to 2.00, and a slab hardness ranging from 30 to 65 in Shore D hardness.

The third golf ball resin composition according to the present invention is obtained by mixing (A) a thermoplastic resin and (B) a carbonaceous filler, wherein (A) the thermoplastic resin comprises (a-1) a metal ion-neutralized product of a binary copolymer composed of an olefin and an α,β-unsaturated carboxylic acid having 3 to 8 carbon atoms, and/or (a-2) a metal ion-neutralized product of a ternary copolymer composed of an olefin, an α,β-unsaturated carboxylic acid having 3 to 8 carbon atoms and an α,β-unsaturated carboxylic acid ester; and (B) the carbonaceous filler has a polar functional group on the surface thereof, and has an average short diameter ranging from 0.1 μm to 100 μm, an average long diameter ranging from 0.2 μm to 300 μm, and an average aspect ratio ranging from 2.0 to 1,000.

According to the present invention, a golf ball exhibiting an excellent shot feeling and resilience is obtained.

DESCRIPTION OF THE PREFERRED EMBODIMENT

Figure 1:
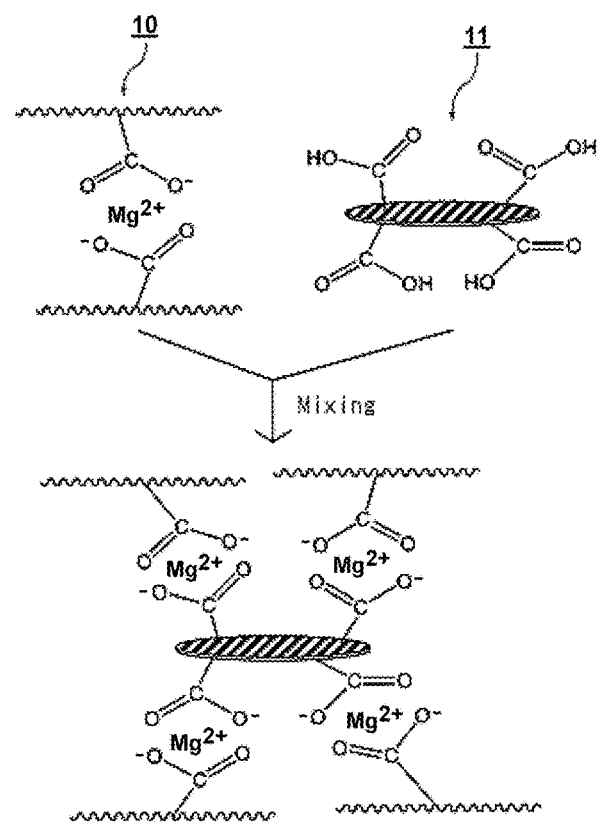
FIG. 1 is a drawing showing a mixed state of an ionomer resin and a carbonaceous filler.

The present invention provide a golf ball resin composition having a bending stiffness ($M_{3-12}$) ranging from 300 kgf/cm$^2$ to 24,000 kgf/cm$^2$ at a bending angle from 3° to 12°, a ratio ($M_{3-12}/M_{24-30}$) of the bending stiffness ($M_{3-12}$) at the bending angle from 3° to 12° to a bending stiffness ($M_{24-30}$) at a bending angle from 24° to 30° ranging from 0.20 to 2.00, and a slab hardness ranging from 30 to 65 in Shore D hardness.

The reason why the golf ball exhibits improved resilience if the ratio ($M_{3-12}/M_{24-30}$) falls within the above range is considered as follows. Generally, the resin material tends to exhibit a lowered bending stiffness with increasing bending angle. In other words, the ratio ($M_{3-12}/M_{24-30}$) of the bending stiffness at the deformation of the bending angle from 3° to 12° (an initial deformation amount of the golf ball when being hit) to the bending stiffness at the deformation of the bending angle from 24° to 30° (a deformation amount of the golf ball when largely deforms) tends to become large. The tendency is particularly remarkable for the resin material comprising a filler (Payne effect). As a result, even the conventional resin material exhibits a large bending stiffness right after the beginning of hitting the golf ball, whereas exhibits a small bending stiffness at the largely deformed state during hitting the golf ball. On the contrary, if the ratio ($M_{3-12}/M_{24-30}$) falls within the above range, the resin material retains a large bending stiffness from the beginning of hitting to the end of hitting, thus the resilience of the golf ball can be improved.

The bending stiffness ($M_{3-12}$) of the golf ball resin composition at the bending angle from 3° to 12° is preferably 300 kgf/cm$^2$ (29.4 MPa) or more, more preferably 500 kgf/cm$^2$ (49.0 MPa) or more, even more preferably 600 kgf/cm$^2$ (58.8 MPa) or more, and particularly preferably 800 kgf/cm$^2$ (78.5 MPa) or more, and is preferably 24,000 kgf/cm$^2$ (2354 MPa) or less, more preferably 10,000 kgf/cm$^2$ (981 MPa) or less, even more preferably 8,000 kgf/cm$^2$ (784.5 MPa) or less, and particularly preferably 6000 kgf/cm$^2$ (588 MPa) or less. If the bending stiffness ($M_{3-12}$) is 300 kgf/cm$^2$ or more, the resultant golf ball exhibits high resilience since the golf ball deforms a little when being hit, and the hitting energy can be efficiently converted to accelerate the golf ball. If the bending stiffness ($M_{3-12}$) is 24,000 kgf/cm$^2$ or less, the golf ball that has suitable flexibility and may suppress impact when being hit, thus exhibiting excellent shot feeling is obtained.

The bending stiffness ($M_{12-15}$) of the golf ball resin composition at the bending angle from 12° to 15° is preferably 300 kgf/cm$^2$ (29.4 MPa) or more, more preferably 600 kgf/cm$^2$ (58.5 MPa) or more, and even more preferably 800 kgf/cm$^2$ (78.5 MPa) or more, and is preferably 24,000 kgf/cm$^2$ (2354 MPa) or less, more preferably 20,000 kgf/cm$^2$ (1961 MPa) or less, even more preferably 10,000 kgf/cm$^2$ (981 MPa) or less, and particularly preferably 6000 kgf/cm$^2$ (588 MPa) or less. If the bending stiffness ($M_{12-15}$) falls within the above range, the obtained golf ball exhibits excellent shot feeling, and shows high resilience since the golf ball deforms a little when being hit.

The bending stiffness ($M_{24-30}$) of the golf ball resin composition at the bending angle from 24° to 30° is preferably 150 kgf/cm$^2$ (14.7 MPa) or more, more preferably 375 kgf/cm$^2$ (36.8 MPa) or more, more preferably 450 kgf/cm$^2$ (44.1 MPa) or more, more preferably 500 kgf/cm$^2$ (49.0 MPa) or more, more preferably 750 kgf/cm$^2$ (73.6 MPa) or more, and even more preferably 800 kgf/cm$^2$ (78.5 MPa) or more, and is preferably 24,000 kgf/cm$^2$ (2354 MPa) or less, more preferably 12,000 kgf/cm$^2$ (1177 MPa) or less, more preferably 8,000 kgf/cm$^2$ (785 MPa) or less, more preferably 6,000 kgf/cm$^2$ (588 MPa) or less, more preferably 5,000 kgf/cm$^2$ (490.4 MPa) or less, and even more preferably 3,000 kgf/cm$^2$ (294.2 MPa) or less. If the bending stiffness ($M_{24-30}$) falls within the above range, the obtained golf ball exhibits excellent shot feeling, and shows high resilience since the golf ball deforms a little when being hit.

The bending stiffness ($M_{36-39}$) of the golf ball resin composition at the bending angle from 36° to 39° is preferably 150 kgf/cm$^2$ (14.7 MPa) or more, more preferably 375 kgf/cm$^2$ (36.8 MPa) or more, and even more preferably 800 kgf/cm$^2$ (78.5 MPa) or more, and is preferably 24,000 kgf/cm$^2$ (2354 MPa) or less, more preferably 12,000 kgf/cm$^2$ (1177 MPa) or less, even more preferably 8,000 kgf/cm$^2$ (785 MPa) or less, and particularly preferably 6,000 kgf/cm$^2$ (588 MPa) or less. If the bending stiffness ($M_{36-39}$) falls within the above range, the resin material retains a large bending stiffness from the beginning of hitting to the end of hitting, thus resilience of the golf ball can be improved.

The ratio ($M_{3-12}/M_{24-30}$) of the golf ball resin composition of the bending stiffness ($M_{3-12}$) at the bending angle from 3° to 12° to the bending stiffness ($M_{24-30}$) at the bending angle from 24° to 30° is preferably 0.20 or more, more preferably 0.50 or more, more preferably 0.80 or more, even more preferably 0.90 or more, and particularly preferably 1.00 or more, and is preferably 2.00 or less, more preferably 1.80 or less, even more preferably 1.70 or less, and particularly preferably 1.50 or less. If the ratio ($M_{3-12}/M_{24-30}$) is 0.20 or more, the bending stiffness of the resin material in the golf ball is not lowered even at the time the resin material deforms by hitting, and the hitting energy can be more efficiently converted to accelerate the golf ball, thus the resultant golf ball exhibits high resilience. If the ratio ($M_{3-12}/M_{24-30}$) is 2.00 or less, the resin material retains a large bending stiffness from the beginning of hitting to the end of hitting, thus resilience of the golf ball can be improved.

The ratio ($M_{12-15}/M_{36-39}$) of the golf ball resin composition of the bending stiffness ($M_{12-15}$) at the bending angle from 12° to 15° to the bending stiffness ($M_{36}$-39) at the bending angle from 36° to 39° is preferably 0.20 or more, more preferably 0.80 or more, and even more preferably 1.00 or more, and is preferably 2.00 or less, more preferably 1.80 or less, and even more preferably 1.50 or less. If the ratio ($M_{12-15}/M_{36-39}$) is 0.20 or more, the bending stiffness of the resin material in the golf ball is not lowered even at the time the resin material deforms by hitting, and the hitting energy can be more efficiently converted to accelerate the golf ball, thus the resultant golf ball exhibits high resilience. If the ratio ($M_{12-15}/M_{36-39}$) is 2.00 or less, the resin material retains a large bending stiffness from the beginning of hitting to the end of hitting, thus resilience of the golf ball can be improved.

The slab hardness of the golf ball resin composition is preferably 30 or more, more preferably 35 or more, more preferably 40 or more, more preferably 45 or more, and even more preferably 50 or more, and is preferably 75 or less, more preferably 70 or less, more preferably 65 or less, more preferably 60 or less, and even more preferably 55 or less in Shore D hardness. If the slab hardness falls within the above range, the golf ball exhibiting better shot feeling can be provided.

The melt flow rate (190° C., 2.16 kgf) of the golf ball resin composition is preferably 0.3 g/10 min or more, more preferably 0.5 g/10 min or more, and even more preferably 1.0 g/10 min or more, and is preferably 20 g/10 min or less, more preferably 15 g/10 min or less, and even more preferably 10 g/10 min or less. If the melt flow rate is 0.3 g/10 min or more, the golf ball resin composition has better fluidity, thus molding a thin layer becomes possible. If the melt flow rate is 20 g/10 min or less, the durability of the resultant golf ball becomes better.

The bending stiffness, slab hardness and melt flow rate of the golf ball resin composition can be controlled by adjusting the type, blending ratio, equivalence ratio and the like of each component.

The golf ball resin composition preferably comprises (A) a thermoplastic resin and (B) a filler. If (A) the thermoplastic resin and (B) the filler are comprised in the golf ball resin composition, the bending stiffness ($M_{3-12}$) and the ratio ($M_{3-12}/M_{24-30}$) are easily controlled within the above range.

Firstly, (A) the thermoplastic resin usable in the present invention will be explained. Examples of (A) the thermoplastic resin include a thermoplastic resin such as an ionomer resin, a thermoplastic olefin copolymer, a thermoplastic polyurethane, a thermoplastic polyamide, a thermoplastic styrene-based resin, a thermoplastic polyester, a thermoplastic acrylic resin, a thermoplastic polyolefin, a thermoplastic polydiene, a thermoplastic polyether, and the like. Among these thermoplastic resins, a thermoplastic elastomer having rubber elasticity is preferable. Examples of the thermoplastic elastomer include a thermoplastic polyurethane elastomer, a thermoplastic polyamide elastomer, a thermoplastic styrene-based elastomer, a thermoplastic polyester elastomer, a thermoplastic acrylic-based elastomer, and the like. In addition, among them, a thermoplastic resin having a carboxylic group is preferable. Examples of the thermoplastic resin having the carboxylic group include the ionomer resin and the thermoplastic olefin copolymer. The content of the acid component having the carboxylic group in the thermoplastic resin is preferably from 4 mass % to 50 mass %. Examples of the acid component include a monomer having a carboxylic group such as acrylic acid, methacrylic acid or the like.

(1) Ionomer Resin

Examples of the ionomer resin include: an ionomer resin consisting of a metal ion-neutralized product of a binary copolymer composed of an olefin and an α,β-unsaturated carboxylic acid having 3 to 8 carbon atoms; an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester; or a mixture thereof.

In the present invention, "the ionomer resin consisting of a metal ion-neutralized product of a binary copolymer composed of an olefin and an α,β-unsaturated carboxylic acid having 3 to 8 carbon atoms" is sometimes merely referred to as "the binary ionomer resin", and "the ionomer resin consisting of a metal ion-neutralized product of a ternary copolymer composed of an olefin, an α,β-unsaturated carboxylic acid having 3 to 8 carbon atoms and an α,β-unsaturated carboxylic acid ester" is sometimes merely referred to as" the ternary ionomer resin".

The olefin is preferably an olefin having 2 to 8 carbon atoms. Examples of the olefin include, for example, ethylene, propylene, butene, pentene, hexene, heptane and octane, and ethylene is particularly preferred. Examples of the α,β-unsaturated carboxylic acid having 3 to 8 carbon atoms include acrylic acid, methacrylic acid, fumaric acid, maleic acid and crotonic acid, and acrylic acid and methacrylic acid are particularly preferred. In addition, examples of the α,β-unsaturated carboxylic acid ester include, for example, methyl ester, ethyl ester, propyl ester, n-butyl ester, isobutyl ester of acrylic acid, methacrylic acid, fumaric acid and maleic acid, and acrylic acid ester and methacrylic acid ester are particularly preferred.

The binary ionomer resin is preferably a metal ion-neutralized product of a binary copolymer composed of ethylene-(meth)acrylic acid. The ternary ionomer resin is preferably a metal ion-neutralized product of a ternary copolymer composed of ethylene, (meth)acrylic acid and (meth)acrylic acid ester. Here, (meth)acrylic acid means acrylic acid and/or methacrylic acid.

The content of the α,β-unsaturated carboxylic acid component having 3 to 8 carbon atoms in the binary ionomer resin is preferably 4 mass % or more, more preferably 6 mass % or more, more preferably 8 mass % or more, more preferably 15 mass % or more, more preferably 16 mass % or more, and even more preferably 17 mass % or more, and is preferably 50 mass % or less, more preferably 30 mass % or less, more preferably 25 mass % or less, and even more preferably 20 mass % or less. If the content of the α,β-unsaturated carboxylic acid component having 3 to 8 carbon atoms is 4 mass % or more, the resultant constituent member has a desirable hardness. If the content of the α,β-unsaturated carboxylic acid component having 3 to 8 carbon atoms is 50 mass % or less, since the hardness of the resultant constituent member does not become excessively high, the durability and the shot feeling thereof become better.

The neutralization degree of the carboxyl groups of the binary ionomer resin is preferably 15 mole % or more, more preferably 20 mole % or more, and even more preferably 50 mole % or more, and is preferably 100 mole % or less, and more preferably 85 mole % or less. If the neutralization degree is 15 mole % or more, the resultant golf ball has better resilience and durability. The neutralization degree of the carboxyl groups of the binary ionomer resin can be calculated by the following expression. Sometimes, the metal component is contained in such an amount that the theoretical neutralization degree of the carboxyl groups contained in the ionomer resin exceeds 100 mole %.

Neutralization degree (mole %) of the binary ionomer resin=100×the number of moles of carboxyl groups neutralized in the binary ionomer resin/the total number of moles of all carboxyl groups contained in the binary ionomer resin Examples of the metal ion used for neutralizing at least a part of carboxyl groups of the binary ionomer resin include: a monovalent metal ion such as sodium, potassium, lithium; a divalent metal ion such as magnesium, calcium, zinc, barium, cadmium; a trivalent metal ion such as aluminum; and other ion such as tin, zirconium.

Specific examples of the binary ionomer resin include trade name "Himilan (registered trademark) (e.g. Himilan 1555 (Na), Himilan 1557 (Zn), Himilan 1605 (Na), Himilan 1706 (Zn), Himilan 1707 (Na), Himilan AM7311 (Mg), Himilan AM7329 (Zn))" commercially manufactured by Mitsui-Du Pont Polychemicals Co., Ltd.

Further, examples include "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li))" commercially manufactured by E.I. du Pont de Nemours and Company.

Further, examples include "Iotek (registered trademark) (e.g. Iotek 8000 (Na), Iotek 8030 (Na), Iotek 7010 (Zn), Iotek 7030 (Zn))" commercially manufactured by ExxonMobil Chemical Corporation.

The binary ionomer resins may be used alone or as a mixture of at least two of them. It is noted that Na, Zn, Li and Mg described in the parentheses after the trade names indicate metal types of neutralizing metal ions of the binary ionomer resins.

The binary ionomer resin preferably has a bending stiffness of 140 MPa or more, more preferably 150 MPa or more, and even more preferably 160 MPa or more, and preferably has a bending stiffness of 550 MPa or less, more preferably 500 MPa or less, even more preferably 450 MPa or less. If the bending stiffness of the binary ionomer resin is excessively low, the flight distance tends to be shorter because of the increased spin rate of the golf ball. If the bending stiffness is excessively high, the durability of the golf ball may be lowered.

The binary ionomer resin preferably has a melt flow rate (190° C., 2.16 kgf) of 0.1 g/10 min or more, more preferably 0.5 g/10 min or more, even more preferably 1.0 g/10 min or more, and preferably has a melt flow rate (190° C., 2.16 kgf) of 30 g/10 min or less, more preferably 20 g/10 min or less, even more preferably 15 g/10 min or less. If the melt flow rate (190° C., 2.16 kgf) of the binary ionomer resin is 0.1 g/10 min or more, the thermoplastic resin composition has better fluidity, thus, for example, molding a thin layer becomes possible. If the melt flow rate (190° C., 2.16 kgf) of the binary ionomer resin is 30 g/10 min or less, the durability of the resultant golf ball becomes better.

The content of the $\alpha,\beta$-unsaturated carboxylic acid component having 3 to 8 carbon atoms in the ternary ionomer resin is preferably 2 mass % or more, more preferably 3 mass % or more, and is preferably 30 mass % or less, more preferably 25 mass % or less.

The neutralization degree of the carboxyl groups of the ternary ionomer resin is preferably 20 mole % or more, more preferably 30 mole % or more, and is preferably 100 mole % or less. If the neutralization degree is 20 mole % or more, the resultant golf ball has better resilience and durability. The neutralization degree of the carboxyl groups of the ionomer resin can be calculated by the following expression. Sometimes, the metal component is contained in such an amount that the theoretical neutralization degree of the carboxyl groups of the ionomer resin exceeds 100 mole %.

Neutralization degree (mole %) of the ionomer resin=100×the number of moles of carboxyl groups neutralized in the ionomer resin/the number of moles of all carboxyl groups contained in the ionomer resin Examples of the metal ion used for neutralizing at least a part of carboxyl groups of the ternary ionomer resin include: a monovalent metal ion such as sodium, potassium, lithium; a divalent metal ion such as magnesium, calcium, zinc, barium, cadmium; a trivalent metal ion such as aluminum; and other ion such as tin, zirconium.

Specific examples of the ternary ionomer resin include trade name "Himilan (registered trademark) (e.g. Himilan AM7327 (Zn), Himilan 1855 (Zn), Himilan 1856 (Na), Himilan AM7331 (Na))" commercially manufactured by Mitsui-Du Pont Polychemicals Co., Ltd. Further, the ternary ionomer resins commercially manufactured by E.I. du Pont de Nemours and Company include "Surlyn 6320 (Mg), Surlyn 8120 (Na), Surlyn 8320 (Na), Surlyn 9320 (Zn), Surlyn 9320W (Zn), HPF1000 (Mg), HPF2000 (Mg) or the like". The ternary ionomer resins commercially manufactured by ExxonMobil Chemical Corporation include "Iotek 7510 (Zn), Iotek 7520 (Zn) or the like". It is noted that Na, Zn and Mg described in the parentheses after the trade names indicate metal types of neutralizing metal ions. The ternary ionomer resins may be used alone or as a mixture of at least two of them.

The ternary ionomer resin preferably has a bending stiffness of 10 MPa or more, more preferably 11 MPa or more, even more preferably 12 MPa or more, and preferably has a bending stiffness of 100 MPa or less, more preferably 97 MPa or less, even more preferably 95 MPa or less. If the bending stiffness of the ternary ionomer resin is excessively low, the flight distance tends to be shorter because of the increased spin rate of the golf ball. If the bending stiffness is excessively high, the durability of the golf ball may be lowered.

The ternary ionomer resin preferably has a melt flow rate (190° C., 2.16 kgf) of 0.1 g/10 min or more, more preferably 0.3 g/10 min or more, even more preferably 0.5 g/10 min or more, and preferably has a melt flow rate (190° C., 2.16 kgf) of 20 g/10 min or less, more preferably 15 g/10 min or less, even more preferably 10 g/10 min or less. If the melt flow rate (190° C., 2.16 kgf) of the ternary ionomer resin is 0.1 g/10 min or more, the thermoplastic resin composition has better fluidity, thus it is easy to mold a thin layer. If the melt flow rate (190° C., 2.16 kgf) of the ternary ionomer resin is 20 g/10 min or less, the durability of the resultant golf ball becomes better.

The ternary ionomer resin preferably has a slab hardness of 20 or more, more preferably 25 or more, even more preferably 30 or more, and preferably has a slab hardness of 70 or less, more preferably 65 or less, even more preferably 60 or less in Shore D hardness. If the ternary ionomer resin has a slab hardness of 20 or more in Shore D hardness, the resultant constituent member does not become excessively soft and thus the golf ball has better resilience. If the ternary ionomer resin has a slab hardness of 70 or less in Shore D hardness, the resultant constituent member does not become excessively hard and thus the golf ball has better durability.

(2) Thermoplastic Olefin Copolymer

Examples of the thermoplastic olefin copolymer include, for example, a binary copolymer composed of an olefin and an $\alpha,\beta$-unsaturated carboxylic acid having 3 to 8 carbon atoms; a ternary copolymer composed of an olefin, an $\alpha,\beta$-unsaturated carboxylic acid having 3 to 8 carbon atoms, and an $\alpha,\beta$-unsaturated carboxylic acid ester; or a mixture thereof. The thermoplastic olefin copolymer is a nonionic copolymer in which the carboxyl groups are not neutralized.

In the present invention, "the binary copolymer composed of an olefin and an $\alpha,\beta$-unsaturated carboxylic acid having 3 to 8 carbon atoms" is sometimes merely referred to as "the binary copolymer", and "the ternary copolymer composed of an olefin, an $\alpha,\beta$-unsaturated carboxylic acid having 3 to 8 carbon atoms, and an $\alpha,\beta$-unsaturated carboxylic acid ester" is sometimes merely referred to as "the ternary copolymer".

Examples of the olefin include the same as the olefin constituting the ionomer resin, and ethylene is particularly preferred. Examples of the $\alpha,\beta$-unsaturated carboxylic acid having 3 to 8 carbon atoms and the ester thereof include the same as the $\alpha,\beta$-unsaturated carboxylic acid having 3 to 8 carbon atoms and the ester constituting the ionomer resin.

The binary copolymer is preferably a binary copolymer composed of ethylene and (meth)acrylic acid. The ternary copolymer is preferably a ternary copolymer composed of ethylene, (meth)acrylic acid, and (meth)acrylic acid ester. Here, (meth)acrylic acid means acrylic acid and/or methacrylic acid.

The content of the α,β-unsaturated carboxylic acid component having 3 to 8 carbon atoms in the binary copolymer or the ternary copolymer is preferably 4 mass % or more, more preferably 5 mass % or more, and even more preferably 8 mass % or more, and is preferably 50 mass % or less, more preferably 20 mass % or less, and more preferably 15 mass % or less.

The binary copolymer or the ternary copolymer preferably has a melt flow rate (190° C., 2.16 kgf) of 5 g/10 min or more, more preferably 10 g/10 min or more, even more preferably 15 g/10 min or more, and preferably has a melt flow rate (190° C., 2.16 kgf) of 1,700 g/10 min or less, more preferably 1,500 g/10 min or less, even more preferably 1,300 g/10 min or less. If the melt flow rate (190° C., 2.16 kgf) of the binary copolymer or the ternary copolymer is 5 g/10 min or more, the thermoplastic resin composition has better fluidity and thus it is easy to mold a constituent member. If the melt flow rate (190° C., 2.16 kgf) of the binary copolymer or the ternary copolymer is 1,700 g/10 min or less, the resultant golf ball has better durability.

Specific examples of the binary copolymer include: an ethylene-methacrylic acid copolymer having a trade name of "NUCREL (registered trademark) (e.g. "NUCREL N1050H", "NUCREL N2050H", "NUCREL N1110H", "NUCREL N0200H")" commercially manufactured by Mitsui-Du Pont Polychemicals Co., Ltd; an ethylene-acrylic acid copolymer having a trade name of "PRIMACOR (registered trademark) 59801" commercially manufactured by Dow Chemical Company; and the like.

Specific examples of the ternary copolymer include: the ternary copolymer having a trade name of "NUCREL (registered trademark) (e.g. "NUCREL AN4318", "NUCREL AN4319")" commercially manufactured by Mitsui-Du Pont Polychemicals Co., Ltd; the ternary copolymer having a trade name of "NUCREL (registered trademark) (e.g. "NUCREL AE")" commercially manufactured by E.I. du Pont de Nemours and Company; the ternary copolymer having a trade name of "PRIMACOR (registered trademark) (e.g. "PRIMACOR AT310", "PRIMACOR AT320")" commercially manufactured by Dow Chemical Company; and the like. The binary copolymer or the ternary copolymer may be used alone or as a mixture of at least two of them.

(3) Thermoplastic Polyurethane and Thermoplastic Polyurethane Elastomer

Examples of the thermoplastic polyurethane and the thermoplastic polyurethane elastomer include a thermoplastic resin and a thermoplastic elastomer which have plurality of urethane bonds in the main molecular chain. The polyurethane is preferably a product obtained by a reaction between a polyisocyanate component and a polyol component. Examples of the thermoplastic polyurethane elastomer include, for example, trade names of "Elastollan (registered trademark) XNY85A", "Elastollan XNY90A", "Elastollan XNY97A", "Elastollan ET885", and "Elastollan ET890" manufactured by BASF Japan Ltd and the like.

(4) Thermoplastic Styrene-Based Elastomer

A thermoplastic elastomer containing a styrene block can be appropriately used as the thermoplastic styrene-based elastomer. The thermoplastic elastomer containing a styrene block has a polystyrene block which is a hard segment, and a soft segment. Typical soft segment is a diene block. Examples of a constituent component of the diene block include butadiene, isoprene, 1,3-pentadiene and 2,3-dimethyl-1,3-butadiene. Butadiene and isoprene are preferable. Two or more constituent components may be used in combination.

The thermoplastic elastomer containing a styrene block includes: a styrene-butadiene-styrene block copolymer (SBS), a styrene-isoprene-styrene block copolymer (SIS), a styrene-isoprene-butadiene-styrene block copolymer (SIBS), a hydrogenated product of SBS, a hydrogenated product of SIS and a hydrogenated product of SIBS. Examples of the hydrogenated product of SBS include a styrene-ethylene-butylene-styrene block copolymer (SEBS). Examples of the hydrogenated product of SIS include a styrene-ethylene-propylene-styrene block copolymer (SEPS). Examples of the hydrogenated product of SIBS include a styrene-ethylene-ethylene-propylene-styrene block copolymer (SEEPS).

The content of the styrene component in the thermoplastic elastomer containing a styrene block is preferably 10 mass % or more, more preferably 12 mass % or more, even more preferably 15 mass % or more. In the view of the shot feeling of the resultant golf ball, the content is preferably 50 mass % or less, more preferably 47 mass % or less, even more preferably 45 mass % or less.

The thermoplastic elastomer containing a styrene block includes an alloy of one kind or two or more kinds selected from the group consisting of SBS, SIS, SIBS, SEBS, SEPS, SEEPS and a hydrogenated product thereof with a polyolefin. It is estimated that the olefin component in the alloy contributes to the improvement in compatibility with the ionomer resin. By using the alloy, the resilience of the golf ball is increased. An olefin having 2 to 10 carbon atoms is preferably used. Appropriate examples of the olefin include ethylene, propylene, butane and pentene. Ethylene and propylene are particularly preferred.

Specific examples of the polymer alloy include the polymer alloys having trade names of "Rabalon (registered trademark) T3221C", "Rabalon T3339C", "Rabalon SJ4400N", "Rabalon SJ5400N", "Rabalon SJ6400N", "Rabalon SJ7400N", "Rabalon SJ8400N", "Rabalon SJ9400N" and "Rabalon SR04" manufactured by Mitsubishi Chemical Corporation. Other specific examples of the thermoplastic elastomer containing a styrene block include "Epofriend A1010" manufactured by Daicel Chemical Industries, Ltd and "Septon HG-252" manufactured by Kuraray Co., Ltd.

(5) Thermoplastic Polyamide and Thermoplastic Polyamide Elastomer

The thermoplastic polyamide is not particularly limited, as long as it is a thermoplastic resin having plurality of amide bonds (—NH—CO—) in the main molecular chain. Examples of the thermoplastic polyamide include, for example, a product having an amide bond in the molecule formed by a ring-opening polymerization of lactam or a reaction between a diamine component and a dicarboxylic acid component.

Examples of the thermoplastic polyamide include an aliphatic polyamide such as polyamide 6, polyamide 11, polyamide 12, polyamide 66, polyamide 610, polyamide 6T, polyamide 61, polyamide 9T, polyamide M5T, polyamide 612; and an aromatic polyamide such as poly-p-phenyleneterephthalamide, poly-m-phenyleneisophthalamide. These polyamides may be used alone or in combination of at least two of them. Among them, the aliphatic polyamide such as polyamide 6, polyamide 66, polyamide 11, polyamide 12 is preferable.

Specific examples of the thermoplastic polyamide include the polyamide resin having a trade name of "Rilsan (registered trademark) B (e.g. Rilsan BESN TL, Rilsan BESN P20 TL, Rilsan BESN P40 TL, Rilsan MB3610, Rilsan BMF O, Rilsan BMN O, Rilsan BMN O TLD, Rilsan BMN BK TLD, Rilsan BMN P20 D, Rilsan BMN P40 D and the like)" commercially manufactured by Arkema Inc., and the like.

The polyamide elastomer has a hard segment part consisting of a polyamide component and a soft segment part. Examples of the soft segment part of the polyamide elastomer include, for example, a polyether ester component or a polyether component. Examples of the polyamide elastomer include, for example, a polyether ester amide obtained by a reaction between a polyamide component (hard segment component) and a polyether ester component (soft segment component) consisting of polyoxyalkylene glycol and dicarboxylic acid; and a polyether amide obtained by a reaction between a polyamide component (hard segment component) and a polyether (soft segment component) consisting of a product obtained by aminating or carboxylating two terminal ends of polyoxyalkylene glycol and dicarboxylic acid or diamine.

Examples of the polyamide elastomer include, for example, "Pebax (registered trademark) 2533", "Pebax 3533", "Pebax 4033", "Pebax 5533" manufactured by Arkema Inc. and the like.

(6) Thermoplastic Polyester and Thermoplastic Polyester Elastomer

The thermoplastic polyester is not particularly limited, as long as it is a thermoplastic resin having plurality of ester bonds in the main molecular chain. For example, a product obtained by a reaction between dicarboxylic acid and diol is preferable. Examples of the thermoplastic polyester elastomer include, for example, a block copolymer having a hard segment consisting of a polyester component and a soft segment. Examples of the polyester component constituting the hard segment include, for example, an aromatic polyester. Examples of the soft segment component include an aliphatic polyether, an aliphatic polyester and the like.

Specific examples of the polyester elastomer include "Hytrel (registered trademark) 3548", "Hytrel 4047" manufactured by Toray-Du Pont Co., Ltd; "Primalloy (registered trademark) A1606", "Primalloy B1600", "Primalloy B1700" manufactured by Mitsubishi Chemical Corporation; and the like.

(7) Thermoplastic (Meth)Acrylic-Based Elastomer

Examples of the thermoplastic (meth)acrylic-based elastomer include a thermoplastic elastomer obtained by copolymerizing ethylene and (meth)acrylic acid ester. Specific examples of the thermoplastic (meth)acrylic-based elastomer include, for example, "Kurarity (a block copolymer of methyl methacrylate and butyl acrylate)" manufactured by Kuraray Co., Ltd.

(8) Thermoplastic Polyolefin

Polyolefin is not particularly limited as long as it is synthesized by using one or two or more kinds of olefin as a monomer. The olefin is preferably an olefin having 2 to 8 carbon atoms, and examples thereof include ethylene, propylene, butene, pentene, hexene, heptane and octane. The polyolefin resin is preferably polyethylene or polypropylene, and is more preferably polyethylene.

(9) Thermoplastic Polydiene

The thermoplastic polydiene is not particularly limited as long as it is synthesized by using one or two or more kinds of diene as a monomer. Examples of the diene include butadiene, isoprene, hexadiene and heptadiene. The thermoplastic polydiene is preferably polybutadiene or polyisoprene.

(10) Thermoplastic Polyether

Specific examples of the thermoplastic polyether include polyacetal (POM), polyphenylene oxide (PPO), polysulfone (PSF), and poly ether ether ketone (PEEK).

(11) Other Thermoplastic Resin

Polyacrylonitrile resin, poly (meth)acrylic acid resin or the like can also be used as (A) the thermoplastic resin.

In addition, in the present invention, a product obtained by modifying the thermoplastic resin exemplified above with halogen, maleic anhydride, ammonia or the like may also be used as (A) the thermoplastic resin.

The thermoplastic resin component preferably contains at least one kind selected from the group consisting of the ionomer resin, the thermoplastic olefin copolymer, the thermoplastic styrene-based elastomer, the thermoplastic polyester elastomer, the thermoplastic polyurethane elastomer, the thermoplastic polyamide elastomer, and the thermoplastic acrylic-based elastomer. This is because a constituent member having a desired hardness can be formed easily.

The slab hardness of (A) the thermoplastic resin is preferably 30 or more, more preferably 35 or more, and even more preferably 40 or more, and is preferably 60 or less, and more preferably 55 or less in Shore D hardness. If the slab hardness of (A) the thermoplastic resin is 30 or more in Shore D hardness, the obtained constituent member is not excessively soft, thus the golf ball exhibits better resilience. If the slab hardness of (A) the thermoplastic resin is 60 or less in Shore D hardness, the obtained constituent member is not excessively hard, thus the golf ball exhibits better shot feeling.

In the present invention, a thermoplastic resin having a carboxyl group is preferably used as (A) the thermoplastic resin. The golf ball resin composition obtained by neutralizing the carboxyl group has a high resilience. The content of the acid component having the carboxyl group in (A) the thermoplastic resin is preferably 4 mass % or more, and more preferably 8 mass % or more, and is preferably 50 mass % or less, more preferably 20 mass % or less, and even more preferably 15 mass % or less. In addition, the carboxyl group of (A) the thermoplastic resin is preferably neutralized with at least one metal ion selected from the group consisting of sodium ion, magnesium ion, calcium ion, and zinc ion.

(A) The thermoplastic resin preferably contains the binary ionomer resin or ternary ionomer resin. In this case, the total content of the binary ionomer resin and/or the ternary ionomer resin in (A) the thermoplastic resin is preferably 50 mass % or more, more preferably 60 mass % or more, and even more preferably 70 mass % or more. (A) The thermoplastic resin preferably consists of the binary ionomer resin and/or ternary ionomer resin.

Next, (B) the filler for use in the present invention will be described. (B) The filler is not particularly limited as long as the bending stiffness ($M_{3-12}$) and the ratio ($M_{3-12}/M_{24-30}$) of the golf ball resin composition can be controlled within the above range. The material of (B) the filler is not particularly limited, an organic filler or inorganic filler can be used. (B) The filler may be used solely, or two or more of them may be used in combination.

(B) The filler is preferably (b-1) a needle-like or fibrous filler, (b-2) a surface organically treated metal filler, or (b-3) a carbonaceous filler.

(b-1) The needle-like or fibrous filler is preferably formed from at least one material selected from the group consisting of wallastonite, potassium titanate, xonotlite, gypsum, aluminum borate, molybdenum disulfide, aramid, zinc oxide, crystalline cellulose, silica, alumina, carbon, glass, mica, and polyoxybenzoyl. Among them, the filler formed from potassium titanate, alumina, or carbon is preferable, and the filler formed from carbon is more preferable. (b-1) The needle-like or fibrous filler is preferably a carbon nanotube.

The average diameter of (b-1) the needle-like or fibrous filler in the transverse direction is preferably 0.02 μm or more, more preferably 0.05 μm or more, and even more preferably 0.08 μm or more, and is preferably 0.3 μm or less, more preferably 0.25 μm or less, and even more preferably 0.2 μm or less. If the average diameter of (b-1) the needle-like or fibrous filler in the transverse direction falls within the above range, the golf ball having excellent resilience while retaining soft shot feeling is easily obtained.

The average length of (b-1) the needle-like or fibrous filler in the longitudinal direction is preferably 3 μm or more, more preferably 4 μm or more, and even more preferably 5 μm or more, and is preferably 50 μm or less, more preferably 30 μm or less, even more preferably 20 μm or less, and particularly preferably 10 μm or less. If the average length of (b-1) the needle-like or fibrous filler in the longitudinal direction falls within the above range, the golf ball having excellent resilience while retaining soft shot feeling is easily obtained.

It is noted that the average length and average diameter of (b-1) the needle-like or fibrous filler or (b-2) the surface organically treated metal filler can be measured with the imaging method. Specifically, the average length and average diameter are a number-based median average (d50) size in the certain direction of the particle, which is obtained by analyzing the microscope photograph of the particle with an image analysis software (for example, Viewtrac (registered trademark) available from Nikkiso Co., Ltd.).

The average aspect ratio of (b-1) the needle-like or fibrous filler is preferably 10 or more, more preferably 15 or more, and even more preferably 25 or more, and is preferably 2,500 or less, more preferably 1,000 or less, even more preferably 400 or less, particularly preferably 125 or less, and most preferably 50 or less. If the average aspect ratio of (b-1) the needle-like or fibrous filler falls within the above range, the golf ball having excellent resilience while retaining soft shot feeling is easily obtained. It is noted that, in the present invention, the average aspect ratio is a ratio (average length in longitudinal direction/average diameter in transverse direction) of the average length of the filler in the longitudinal direction to the average diameter of the filler in the transverse direction.

(b-1) The needle-like or fibrous filler preferably forms an aggregate in the golf ball resin composition. The aggregate means a state in which the primary particle of (b-1) the needle-like or fibrous filler gathers in contact with other primary particles. If such aggregate is formed, the resultant golf ball exhibits further enhanced shot feeling and resilience. The number of (b-1) the needle-like or fibrous filler constituting one aggregate is preferably 10 or more, more preferably 60 or more, and even more preferably 300 or more, and is preferably 10,000 or less, more preferably 6,000 or less, and even more preferably 2,000 or less.

The length of the primary particle forming the aggregate in the longitudinal direction is preferably less than 3 μm, more preferably 2 μm or less, and even more preferably 1 μm or less. If the length of the primary particle in the longitudinal direction is less than 3 μm, both shot feeling and resilience of the golf ball are enhanced by the action of the aggregate. The lower limit of the length of the primary particle in the longitudinal direction is not particularly limited, but the lower limit is preferably 50 nm or more.

The average long diameter of the aggregate is preferably 1 μm or more, more preferably 2 μm or more, and even more preferably 3 μm or more, and is preferably 500 μm or less, more preferably 100 μm or less, and even more preferably 60 μm or less. If the average long diameter of the aggregate is 1 μm or more, the resilience performance of the obtained golf ball is further enhanced, and if the average long diameter of the aggregate is 500 μm or less, good shot feeling of the obtained golf ball can be maintained. It is noted that the average long diameter of the aggregate can be confirmed by analyzing the microscope photograph of the particles with an image analysis software (for example, Viewtrac available from Nikkiso Co., Ltd.), and is a number average value of the long axis length of the rectangle circumscribing the aggregate in the microscope photograph.

(A) The thermoplastic resin is preferably present in the void between (b-1) the needle-like or fibrous fillers constituting the aggregate. If (A) the thermoplastic resin is present in the void, the resultant golf ball exhibits further enhanced shot feeling and resilience. In this case, the distance between the primary particles is preferably 500 nm or less, more preferably 350 nm or less, and even more preferably 200 nm or less.

The content of the aggregate is preferably 5% or more, more preferably 10% or more, and even more preferably 20% or more, and is preferably 70% or less, more preferably 60% or less, and even more preferably 50% or less. If the content of the aggregate is 5% or more, the resilience performance of the obtained golf ball is further enhanced, and if the content of the aggregate is 70% or less, shot feeling of the obtained golf ball becomes better. It is noted that the content of the aggregate can be confirmed by forming a slab from the resin composition, and analyzing the microscope photograph of the slab surface with an image analysis software (for example, Viewtrac available from Nikkiso Co., Ltd.), and is an area ratio of the aggregate contained in the observation area.

The aggregate can be formed, for example, by kneading (A) the thermoplastic resin and (b-1) the needle-like or fibrous filler under a high temperature condition, followed by further kneading under a low temperature condition which is set such that the material temperature is lower than that under the high temperature condition. The material temperature under the high temperature condition is preferably 205° C. or more, more preferably 210° C. or more, and is preferably 260° C. or less, more preferably 240° C. or less. If the material temperature under the high temperature condition falls within the above range, (b-1) the needle-like or fibrous filler can be uniformly dispersed in (A) the thermoplastic resin. The material temperature under the low temperature condition is preferably 185° C. or more, more preferably 190° C. or more, and is preferably 215° C. or less, more preferably 210° C. or less. (A) The thermoplastic resin has a high viscosity under the low temperature condition, thus (b-1) the needle-like or fibrous filler easily breaks into fine particles at the time of kneading, and the aggregate is easily formed from the generated particles.

The amount of (b-1) the needle-like or fibrous filler is not particularly limited, but the amount is preferably 1 part by mass or more, more preferably 5 parts by mass or more, even more preferably 10 parts by mass or more, and particularly preferably 12 parts by mass or more, and is preferably 25 parts by mass or less, more preferably 20 parts by mass or less, and more preferably 15 parts by mass or less, with respect to 100 parts by mass of (A) the thermoplastic resin. If the amount of (b-1) the needle-like or fibrous filler falls within the above range, the golf ball having excellent resilience while retaining soft shot feeling is easily obtained.

(b-2) The surface organically treated metal filler is not particularly limited as long as it is a metal filler whose surface is organically treated. (b-2) The surface organically treated metal filler is preferably a metal filler obtained by coating the surface of at least one metal selected from the group consisting of aluminum, titanium, zinc, chromium, iron, nickel, tin, and copper, with a polymer composed of an α,β-unsaturated carboxylic acid and/or a derivate thereof.

(b-2) The surface organically treated metal filler has good compatibility with (A) the thermoplastic resin, thus the reinforcement effect by the filler becomes large. Particularly, for (A) the thermoplastic resin having the carboxyl group, the metal filler obtained by coating the surface thereof with the polymer composed of the α,β-unsaturated carboxylic acid and/or the derivate thereof is preferably used. This is because the carboxyl group of (A) the thermoplastic resin and the carboxyl group of the polymer coating the filler surface form an ion association via the metal ion. As a result, the reinforcement effect by the metal filler further increases.

The α,β-unsaturated carboxylic acid constituting the polymer is not particularly limited, and is preferably an α,β-unsaturated carboxylic acid having 3 to 8 carbon atoms. Examples of the α,β-unsaturated carboxylic acid include (meth)acrylic acid, fumaric acid, maleic acid, and crotonic acid.

As the derivate of the α,β-unsaturated carboxylic acid, for example, an α,β-unsaturated carboxylic acid ester, an α,β-unsaturated carboxylic acid halide, an α,β-unsaturated carboxylic acid imidazole, and the like may be used, particularly, (meth)acrylic acid ester such as (meth)acrylic acid methyl ester, (meth)acrylic acid ethyl ester, (meth)acrylic acid n-propyl ester, (meth)acrylic acid i-propyl ester, (meth)acrylic acid 1-methylpropyl ester, (meth)acrylic acid 2-methylpropyl ester, (meth)acrylic acid n-butyl ester and (meth)acrylic acid t-butyl ester; (meth)acrylic acid halide such as (meth)acrylic acid chloride and (meth)acrylic acid bromide; and (meth)acrylic acid imidazole are preferable.

The polymer composed of the α,β-unsaturated carboxylic acid and/or the derivate thereof is preferably a polymer composed of (meth)acrylic acid and/or the derivate of (meth)acrylic acid. Examples of the polymer composed of (meth)acrylic acid and/or the derivate of (meth)acrylic acid include a homopolymer of (meth)acrylic acid, and a copolymer of (meth)acrylic acid and (meth)acrylic acid ester. The polymer may be one kind, or two or more kinds of polymer may be used in combination. Here, (meth)acrylic acid means acrylic acid and/or methacrylic acid.

The average diameter of (b-2) the surface organically treated metal filler in the transverse direction is preferably 0.1 µm or more, and is preferably 200 µm or less, more preferably 30 µm or less, and even more preferably 0.5 µm or less. If the average diameter of (b-2) the surface organically treated metal filler in the transverse direction falls within the above range, the golf ball having excellent resilience while retaining soft shot feeling is easily obtained.

The average length of (b-2) the surface organically treated metal filler in the longitudinal direction is preferably 0.5 µm or more, more preferably 5 µm or more, and is preferably 300 µm or less, more preferably 100 µm or less, and even more preferably 20 µm or less. If the average length of (b-2) the surface organically treated metal filler in the longitudinal direction falls within the above range, the golf ball having excellent resilience while retaining soft shot feeling is easily obtained.

The average aspect ratio of (b-2) the surface organically treated metal filler is preferably 1.5 or more, more preferably 3.3 or more, and even more preferably 10 or more, and is preferably 3,000 or less, more preferably 1,000 or less, and even more preferably 200 or less. If the average aspect ratio of (b-2) the surface organically treated metal filler falls within the above range, the golf ball having excellent resilience while retaining soft shot feeling is easily obtained. It is noted that, in the present invention, the average aspect ratio is a ratio (average length in longitudinal direction/average diameter in transverse direction) of the average length of the filler in the longitudinal direction to the average diameter of the filler in the transverse direction.

(b-2) The surface organically treated metal filler preferably has a polar functional group on the surface thereof. Examples of the polar functional group include a carboxyl group (—COOH), hydroxyl group (—OH), amino group (—$NH_2$), thiol group (—SH), sulfo group (—$SO_3H$), and phosphonic acid group (—$PO(OH)_2$).

The amount of the polar functional group per unit mass of (b-2) the surface organically treated metal filler is preferably 0.2 µg/g or more, more preferably 10 µg/g or more, and even more preferably 40 µg/g or more, and is preferably 300 µg/g or less, more preferably 220 µg/g or less, and even more preferably 150 µg/g or less. If the amount of the polar functional group is 0.2 µg/g or more, the bending stiffness of the golf ball resin composition further increases, thus the obtained golf ball exhibits a further enhanced flying performance. If the amount of the polar functional group is 300 µg/g or less, the golf ball resin composition is not excessively hard, thus the obtained golf ball exhibits better shot feeling.

It is noted that the amount of the polar functional group of (b-2) the surface organically treated metal filler can be measured by utilizing thermogravimetric analysis and microscope FTIR analysis in combination. Specifically, the coating amount of the coating agent is measured by thermogravimetric analysis, and the amount of the polar functional group in the coating agent is measured by microscope FTIR analysis, based on these measurement results, the amount of the polar functional group of (b-2) the surface organically treated metal filler can be calculated.

The amount of (b-2) the surface organically treated metal filler is not particularly limited, but the amount is preferably 1 part by mass or more, more preferably 2 parts by mass or more, and even more preferably 3 parts by mass or more, and is preferably 25 parts by mass or less, more preferably 20 parts by mass or less, and more preferably 15 parts by mass or less, with respect to 100 parts by mass of (A) the thermoplastic resin. If the amount of (b-2) the surface organically treated metal filler falls within the above range, the golf ball having excellent resilience while retaining soft shot feeling is easily obtained.

Examples of the material of (b-3) the carbonaceous filler include a natural graphite, synthetic graphite, carbon fiber, and carbon black. Among them, graphite is preferable, graphene or a graphite flake is particularly preferable. It is noted that graphene is a sheet composed of a single layer having one atom thickness peeled from graphite.

(b-3) The carbonaceous filler has a polar functional group on the surface thereof. Examples of the polar functional group include a carboxyl group (—COOH), hydroxyl group (—OH), amino group (—$NH_2$), thiol group (—SH), sulfo group (—$SO_3H$), and phosphonic acid group (—$PO(OH)_2$).

The amount of the polar functional group per unit mass of (b-3) the carbonaceous filler is preferably 0.3 mmol/g or more, more preferably 0.5 mmol/g or more, and even more preferably 1.0 mmol/g or more, and is preferably 5.0 mmol/g or less, more preferably 3.0 mmol/g or less, and even more preferably 2.5 mmol/g or less. If the amount of the polar functional group is 0.3 mmol/g or more, the bending stiffness of the golf ball resin composition further increases, and if the amount of the polar functional group is 5.0 mmol/g or less, the golf ball resin composition exhibits better fluidity. It is noted that the amount of the polar functional group of (b-3) the carbonaceous filler can be measured by titration or X-ray photoelectron spectroscopy.

The average short diameter of (b-3) the carbonaceous filler is preferably 0.1 μm or more, more preferably 0.5 μm or more, and even more preferably 10 μm or more, and is preferably 100 μm or less, more preferably 90 μm or less, and even more preferably 80 μm or less. If the average short diameter of (b-3) the carbonaceous filler is 0.1 μm or more, the bending stiffness of the golf ball resin composition further increases, and if the average short diameter of (b-3) the carbonaceous filler is 100 μm or less, the golf ball resin composition exhibits better fluidity and flexibility.

The average long diameter of (b-3) the carbonaceous filler is preferably 0.2 μm or more, more preferably 3.0 μm or more, and even more preferably 5.0 μm or more, and is preferably 300 μm or less, more preferably 280 μm or less, and even more preferably 250 μm or less. If the average long diameter of (b-3) the carbonaceous filler is 0.2 μm or more, the bending stiffness of the golf ball resin composition further increases, and if the average long diameter of (b-3) the carbonaceous filler is 300 μm or less, the golf ball resin composition exhibits better fluidity and flexibility.

The average aspect ratio of (b-3) the carbonaceous filler is preferably 2.0 or more, more preferably 5.0 or more, and even more preferably 10 or more, and is preferably 1000 or less, more preferably 800 or less, and even more preferably 600 or less. If the average aspect ratio of (b-3) the carbonaceous filler is 2.0 or more, the bending stiffness of the golf ball resin composition further increases, and if the average aspect ratio of (b-3) the carbonaceous filler is 1000 or less, the golf ball resin composition exhibits better fluidity and flexibility. It is noted that the average aspect ratio is a ratio (average long diameter/average short diameter) of the average long diameter of the filler to the average short diameter of the filler.

The average thickness of (b-3) the carbonaceous filler is preferably 0.3 nm or more, more preferably 0.5 nm or more, and even more preferably 1.0 nm or more, and is preferably 50 nm or less, more preferably 40 nm or less, even more preferably 30 nm or less. If the average thickness of (b-3) the carbonaceous filler is 0.3 nm or more, the bending stiffness of the golf ball resin composition further increases, and if the average thickness of (b-3) the carbonaceous filler is 50 nm or less, the golf ball resin composition exhibits better flexibility.

The short diameter, long diameter and thickness are side lengths of the cuboid circumscribing the particle. In other words, for the cuboid circumscribing the particle, the long axis thereof having the longest axis is regarded as the long diameter (length), the short axis thereof having the shortest axis is regarded as the thickness (height), and the width thereof is regarded as the short diameter (width).

The number average short diameter, number average long diameter and number average thickness of (b-3) the carbonaceous filler are obtained by measuring the short diameter, long diameter and thickness of 50 or more particles with a scanning electron microscope (XL30ESEM available from Philips company), and calculating the average value thereof.

The amount of (b-3) the carbonaceous filler is preferably 1 part by mass or more, more preferably 8 parts by mass or more, and even more preferably 10 parts by mass or more, and is preferably 30 parts by mass or less, and more preferably 25 parts by mass or less, with respect to 100 parts by mass of (A) the thermoplastic resin. If the amount of (b-3) the carbonaceous filler is 1 part by mass or more, the bending stiffness of the golf ball resin composition further increases, and if the amount of (b-3) the carbonaceous filler is 30 parts by mass or less, the golf ball resin composition exhibits better flexibility.

In the case that (b-3) the carbonaceous filler is used as (B) the filler, (A) the thermoplastic resin preferably comprises a metal ion-neutralized product of a binary copolymer composed of an olefin and an α,β-unsaturated carboxylic acid having 3 to 8 carbon atoms, and/or a metal ion-neutralized product of a ternary copolymer composed of an olefin, an α,β-unsaturated carboxylic acid having 3 to 8 carbon atoms and an α,β-unsaturated carboxylic acid ester. If the ionomer resin and (b-3) the carbonaceous filler are used in combination, the golf ball resin composition exhibits enhanced resilience while retaining flexibility.

The reason why the golf ball resin composition exhibits enhanced resilience while retaining flexibility if (b-3) the carbonaceous filler is comprised is considered as follows. FIG. 1 shows a mixed state of an ionomer resin and a carbonaceous filler. As shown in FIG. 1, carboxyl groups on the adjacent molecular chains of the ionomer resin are crosslinked via a metal ion (Mg ion in FIG. 1). If the carbonaceous filler having the polar functional group (carboxyl group in FIG. 1) is comprised in the ionomer resin, the polar functional group of the carbonaceous filler and the carboxyl group in the molecule of the ionomer resin form an ion bond via the metal ion. As a result, multiple molecular chains are crosslinked by the carbonaceous filler, the golf ball resin composition exhibits enhanced resilience. It is noted that the embodiment of forming the ion bond is described in FIG. 1, however, a covalent bond, hydrogen bond or the like may also be formed depending on the type of the polar functional group of the carbonaceous filler.

In addition, because (b-3) the carbonaceous filler has a flake shape, (b-3) the carbonaceous filler is easily orientated along the circumferential direction of the constituent member when the constituent member is formed. In other words, the laminated structure of the carbonaceous filler and the resin is formed in the radius direction of the constituent member. As a result, the resin that is present between the carbonaceous fillers easily deforms corresponding to the compression along the radius direction, thus flexibility is retained.

The golf ball resin composition preferably further contains (C) an amphoteric surfactant, in addition to the (A) component and (B) component. It is considered that (C) the amphoteric surfactant is taken in the ion association of (A) the thermoplastic resin (for example, an ionomer resin), (I) finely disperses the ion association and inhibits crystallization of ethylene chains, and (II) weakens constraining of main chains by the ion association. With these actions, the mobility of the molecular chain of the golf ball resin composition increases, and the resilience increases while retaining the flexibility.

(C) The amphoteric surfactant is not particularly limited, as long as it has a cationic part and anionic part within the molecule thereof, and has an action of lowering surface tension when being dissolved in water. Examples of (C) the amphoteric surfactant include a betaine type amphoteric surfactant such as alkylbetaine type, amidobetaine type, imidazoliumbetaine type, alkylsulfobetain type, amidosulfobetain type, and the like; amidoamino acid type amphoteric surfactant and alkylamino fatty acid salt; alkylamine oxide; β-alanine type amphoteric surfactant and glycine type amphoteric surfactant; sulfobetaine type amphoteric surfactant; phosphobetaine type amphoteric surfactant; and the like. (C) The amphoteric surfactant may be used solely, or two or more of them may be used in combination.

Specific examples of (C) the amphoteric surfactant include dimethyllaurylbetaine, oleyldimethylamino acetic acid betaine (oleylbetaine), dimethyloleylbetaine, dimethylstearylbetaine, stearyldihydroxymethylbetaine, stearyldihydroxyethylbetaine, lauryldihydroxymethylbetaine, lauryldihydroxyethylbetaine, myristyldihydroxymethylbetaine, behenyldihydroxymethylbetaine, palmityldihydroxyethylbetaine, oleyldihydroxymethylbetaine, coconut oil fatty acid amidopropylbetaine, lauric acid amidoalkylbetaine, 2-alkyl-N-carboxyalkylimidazoliumbetaine, lauric acid amidoalkylhydroxysulfobetaine, coconut oil fatty acid amidodialkylhydroxyalkylsulfobetaine, N-alkyl-β-aminopropionic acid salt, N-alkyl-β-iminodipropionic acid salt, alkyldiaminoalkylglycine, alkylpolyaminoalkylglycine, sodium salt of alkylamino fatty acid, N,N-dimethyloctylamine oxide, N,N-dimethyllaurylamine oxide, N,N-dimethylstearylamine oxide, and the like. (C) The amphoteric surfactant may be used solely, or two or more of them may be used in combination.

The amount of (C) the amphoteric surfactant is not particularly limited, but the amount is preferably 1 part by mass or more, more preferably 5 parts by mass or more, even more preferably 10 parts by mass or more, and particularly preferably 20 parts by mass or more, and is preferably 200 parts by mass or less, more preferably 150 parts by mass or less, and even more preferably 100 parts by mass or less, with respect to 100 parts by mass of (A) the thermoplastic resin. If the amount of (C) the amphoteric surfactant falls within the above range, the surfactant molecule is easily taken in the ion association of the thermoplastic resin (for example, an ionomer resin), thus the mobility of the molecular chain of the thermoplastic resin increases, and the resilience increases while retaining the flexibility.

In the case that (A) the thermoplastic resin contains an ionomer resin, the amount of (C) the amphoteric surfactant is preferably 1 part by mass or more, more preferably 10 parts by mass or more, and even more preferably 30 parts by mass or more, and is preferably 90 parts by mass or less, more preferably 80 parts by mass or less, and even more preferably 70 parts by mass or less, with respect to 100 parts by mass of (C) the ionomer resin. If the amount of (C) the amphoteric surfactant falls within the above range, the surfactant molecule is easily taken in the ion association of the ionomer resin, thus the mobility of the molecular chain of the ionomer resin increases, and the resilience increases while retaining the flexibility.

The golf ball resin composition preferably further contains (D) a fatty acid. If (D) the fatty acid is contained, the golf ball resin composition has better fluidity, thus, for example, molding a thin layer becomes possible. (D) The fatty acid is not particularly limited as long as it has an action of increasing the fluidity of the golf ball resin composition, and may be a saturated fatty acid or unsaturated fatty acid. In addition, (D) the fatty acid may be a straight chain fatty acid or branched chain fatty acid.

The carbon atom number of the (D) the fatty acid is preferably 4 or more, more preferably 12 or more, and even more preferably 16 or more, and is preferably 30 or less, more preferably 28 or less, and even more preferably 26 or less Specific examples of the saturated fatty acid (IUPAC name) include butanoic acid (C4), pentanoic acid (C5), hexanoic acid (C6), heptanoic acid (C7), octanoic acid (C8), nonanoic acid (C9), decanoic acid (C10), undecanoic acid (C11), dodecanoic acid (C12), tridecanoic acid (C13), tetradecanoic acid (C14), pentadecanoic acid (C15), hexadecanoic acid (C16), heptadecanoic acid (C17), octadecanoic acid (C18), nonadecanoic acid (C19), icosanoic acid (C20), henicosanoic acid (C21), docosanoic acid (C22), tricosanoic acid (C23), tetracosanoic acid (C24), pentacosanoic acid (C25), hexacosanoic acid (C26), heptacosanoic acid (C27), octacosanoic acid (C28), nonacosanoic acid (C29), and triacontanoic acid (C30).

Specific examples of the unsaturated fatty acid (IUPAC name) include butenoic acid (C4), pentenoic acid (C5), hexenoic acid (C6), heptenoic acid (C7), octenoic acid (C8), nonenoic acid (C9), decenoic acid (C10), undecenoic acid (C11), dodecenoic acid (C12), tridecenoic acid (C13), tetradecenoic acid (C14), pentadecenoic acid (C15), hexadecenoic acid (C16), heptadecenoic acid (C17), octadecenoic acid (C18), nonadecenoic acid (C19), icosenoic acid (C20), henicosenoic acid (C21), docosenoic acid (C22), tricosenoic acid (C23), tetracosenoic acid (C24), pentacosenoic acid (C25), hexacosenoic acid (C26), heptacosenoic acid (C27), octacosenoic acid (C28), nonacosenoic acid (C29), and triacontenoic acid (C30).

Specific examples of (D) the fatty acid (Common name) include butyric acid (C4), valeric acid (C5), caproic acid (C6), enanthic acid (C7), caprylic acid (C8), pelargonic acid (C9), capric acid (C10), lauric acid (C12), myristic acid (C14), myristoleic acid (C14), pentadecylic acid (C15), palmitic acid (C16), palmitoleic acid (C16), margaric acid (C17), stearic acid (C18), elaidic acid (C18), vaccenic acid (C18), oleic acid (C18), linoleic acid (C18), linolenic acid (C18), 12-hydroxy stearic acid (C18), arachidic acid (C20), gadoleic acid (C20), arachidonic acid (C20), eicosenoic acid (C20), behenic acid (C22), erucic acid (C22), lignoceric acid (C24), nervonic acid (C24), cerotic acid (C26), montanic acid (C28), and melissic acid (C30). (D) The fatty acid may be used solely, or two or more of them may be used in combination.

The amount of (D) the fatty acid is not particularly limited, but the amount is preferably 1 part by mass or more, more preferably 5 parts by mass or more, even more preferably 10 parts by mass or more, and particularly preferably 20 parts by mass or more, and is preferably 200 parts by mass or less, more preferably 150 parts by mass or less, and even more preferably 100 parts by mass or less, with respect to 100 parts by mass of (A) the thermoplastic resin. If the amount of (D) the fatty acid falls within the above range, the fatty acid hardly bleed out therefrom and the golf ball resin composition having suitable fluidity is easily obtained.

As (D) the fatty acid, a fatty acid salt may be used. Examples of the cation component of the fatty acid salt include a metal ion, ammonium ion, and organic cation. Examples of the metal ion include a monovalent metal ion such as sodium, potassium, lithium, and silver; a divalent metal ion such as magnesium, calcium, zinc, barium, cadmium, copper, cobalt, nickel, and manganese; a trivalent metal ion such as aluminum and iron; and other ion such as tin, zirconium, and titanium. The cation component may be used solely, or two or more of them may be used in combination.

In the case that (A) the thermoplastic resin has a carboxyl group, the golf ball resin composition preferably contains (E) a metal compound for neutralizing the unneutralized carboxyl group of (A) the thermoplastic resin. If (E) the metal compound is contained, the neutralization degree of the thermoplastic resin can be increased. If the neutralization degree is increased, resilience of the obtained constituent member becomes higher.

(E) The metal compound is not particularly limited as long as it can neutralize at least a part of carboxyl groups in the thermoplastic resin, and examples thereof include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate.

In addition, as (E) the metal compound, a basic metal salt of a fatty acid may also be used. Specific examples of the basic metal salt of the fatty acid include basic magnesium laurate, basic calcium laurate, basic zinc laurate, basic magnesium myristate, basic calcium myristate, basic zinc myristate, basic magnesium palmitate, basic calcium palmitate, basic zinc palmitate, basic magnesium oleate, basic calcium oleate, basic zinc oleate, basic magnesium stearate, basic calcium stearate, basic zinc stearate, basic magnesium 12-hydroxystearate, basic calcium 12-hydroxystearate, basic zinc 12-hydroxystearate, basic magnesium behenate, basic calcium behenate, and basic zinc behenate. (E) The metal compound may be used alone or as a mixture of at least two of them. The amount of (E) the metal compound may be appropriately determined according to the neutralization degree of the carboxyl group in (A) the thermoplastic resin or the total neutralization degree of the golf ball resin composition which will be described later.

The total neutralization degree of the golf ball resin composition expressed by the following equation is preferably 30% or more, more preferably 70% or more, and even more preferably 85% or more, and is preferably 300% or less, more preferably 200% or less, and even more preferably 150% or less. If the total neutralization degree falls within the above range, the resin has better shot feeling and high resilience.

The total neutralization degree is defined by the following equation.

Total Neutralization Degree (%)=100×[number of moles of a cation component in (A) the resin component×valence of the cation component+number of moles of a cation component in (E) the metal compound×valence of the cation component]/[number of moles of the carboxyl group in (A) the resin component+number of moles of the carboxyl group in (D) the fatty acid]

It is noted that the number of moles of the cation component, metal component, and carboxyl group include the number of moles of a unionized precursor. The amount of the cation component and the amount of the anion component may be determined, for example, by a neutralization titration method.

In the golf ball resin composition according to the present invention, the equivalence ratio ((equivalence of the metal ion+equivalence of the amino group)/equivalence of the carboxyl group) of the metal ion in the golf ball resin composition and the amino group in the (C) component to the carboxyl group in the (A) component, (C) component and (D) component is preferably 0.5 or more, more preferably 0.65 or more, and even more preferably 0.8 or more, and is preferably 2.0 or less, more preferably 1.6 or less, and even more preferably 1.4 or less. If the equivalence ratio is 0.5 or more, the resilience of the golf ball resin composition further increases, and if the equivalence ratio is 2.0 or less, the flexibility of the golf ball resin composition becomes better.

The equivalence of the carboxyl group is the total mole numbers of the carboxyl group in the (A) component, (C) component and (D) component. The equivalence of the metal ion is a sum of the product obtained by multiplying the mole numbers of the metal ion in the (A) component, (D) component and (E) metal compound by the valence of that metal ion.

The golf ball resin composition may further contain an additive. Examples of the additive include a pigment component such as a white pigment (for example, titanium oxide), a blue pigment or the like; a weight adjusting agent; a dispersant; an antioxidant; an ultraviolet absorber; a light stabilizer; a fluorescent material or a fluorescent brightener. Examples of the weight adjusting agent include an inorganic filler such as zinc oxide, barium sulfate, calcium carbonate, magnesium oxide, tungsten powder, molybdenum powder.

The content of the white pigment (for example, titanium oxide) is preferably 0.5 part by mass or more, more preferably 1 part by mass or more, and is preferably 10 parts by mass or less, more preferably 8 parts by mass or less, with respect to 100 parts by mass of (A) the thermoplastic resin. If the content of the white pigment is 0.5 part by mass or more, it is possible to impart the opacity to the obtained constituent member of the golf ball. If the content of the white pigment is more than 10 parts by mass, the durability of the obtained constituent member of the golf ball may deteriorate.

The golf ball resin composition according to the present invention can be obtained, for example, by melt blending (A) the thermoplastic resin, (B) the filler, and where necessary (C) the amphoteric surfactant, (D) the fatty acid, (E) the metal compound and other additives. The melt blending may be carried out using a kneader or an extruder (e.g. single-screw extruder, twin-screw extruder, and twin-single screw extruder).

In the case of using (b-3) the carbonaceous filler as (B) the filler, the material temperature at the time of blending (A) the thermoplastic resin and (b-3) the carbonaceous filler is preferably 150° C. or more, more preferably 170° C. or more, and even more preferably 180° C. or more, and is preferably 220° C. or less. If the material temperature at the time of blending is 150° C. or more, (b-3) the carbonaceous filler is easily kneaded in (A) the thermoplastic resin.

The order of blending each material is not particularly limited, but it is preferred that the components except (b-3) the carbonaceous filler is blended at a material temperature of 200° C. or more, and then (b-3) the carbonaceous filler is blended in the obtained mixture at a material temperature of less than 200° C. The components except (b-3) the carbonaceous filler are easily kneaded at the temperature of 200° C. or more. On the other hand, if the material temperature is excessively high, the surface functional group of (b-3) the carbonaceous filler tends to be eliminated, thus the material temperature at the time of blending (b-3) the carbonaceous filler is preferably less than 200° C. (more preferably 190° C. or less).

[Golf Ball]

The golf ball according to the present invention is not particularly limited, as long as it comprises a constituent member formed from the above golf ball resin composition. For example, in a two-piece golf ball comprising a single-layered core and a cover disposed around the core, in a three-piece golf ball comprising a core, a single-layered intermediate layer disposed around the core, and a cover disposed around the intermediate layer, in a multi-piece golf ball (including the three-piece golf ball mentioned above) comprising a core, at least one intermediate layer disposed around the core, and a cover disposed around the intermediate layer, any one of constituent members may be formed from the above golf ball resin composition. Among them, the golf ball in which the intermediate layer thereof is formed from the golf ball resin composition according to the present invention is preferable.

The constituent member formed from the above golf ball resin composition may be any one of the core, intermediate layer, and cover, but the intermediate layer is preferable. In the golf ball, other part than the constituent member formed from the above golf ball resin composition can be formed using the conventional materials.

The core may be formed using a conventional rubber composition (hereinafter also abbreviated as "core rubber composition"). For example, the core may be formed by heat pressing a rubber composition containing a base rubber, a co-crosslinking agent, and a crosslinking initiator. The core of the golf ball according to the present invention may be a single-layered core or a multi-layered core.

As the base rubber, a natural rubber and/or a synthetic rubber may be used. Examples of the base rubber include a polybutadiene rubber, a natural rubber, a polyisoprene rubber, a styrene polybutadiene rubber, and an ethylene-propylene-diene rubber (EPDM). These rubbers can be used solely or as a combination of two or more kinds. Among them, particularly preferred is a high cis-polybutadiene having cis-1,4-bond which is beneficial to resilience in a content of 40 mass % or more, more preferably 80 mass % or more, and even more preferably 90 mass % or more.

The crosslinking initiator is blended to crosslink the base rubber component. As the crosslinking initiator, an organic peroxide is preferably used. Specific examples of the organic peroxide are dicumyl peroxide, 1,1-bis(t-butylperoxy)-3,3,5-trimethylcyclohexane, 2,5-dimethyl-2,5-di(t-butylperoxy) hexane, and di-t-butyl peroxide. The organic peroxide can be used solely or as a combination of two or more kinds. Among them, dicumyl peroxide is preferably used. The content of the crosslinking initiator is preferably 0.2 part by mass or more, more preferably 0.3 part by mass or more, and is preferably 3 parts by mass or less, more preferably 2 parts by mass or less, with respect to 100 parts by mass of the base rubber. If the content of the crosslinking initiator is less than 0.2 part by mass, the core becomes so soft that resilience of the golf ball tends to be lowered, and if the content of the crosslinking initiator is more than 3 parts by mass, the amount of the co-crosslinking agent must be decreased to obtain an appropriate hardness, which tends to cause insufficient resilience and worse durability of the golf ball.

The co-crosslinking agent is not particularly limited as long as it has an action of crosslinking a rubber molecule by graft polymerization to a base rubber molecular chain. As the co-crosslinking agent, for example, an α,β-unsaturated carboxylic acid having 3 to 8 carbon atoms or a metal salt thereof can be used, acrylic acid, methacrylic acid and a metal salt thereof are preferable. Examples of the metal constituting the metal salt include zinc, magnesium, calcium, aluminum and sodium, among them, zinc salt is preferably used because it provides high resilience to the golf ball. The amount of the co-crosslinking agent is preferably 10 parts by mass or more, more preferably 20 parts by mass or more, and is preferably 50 parts by mass or less, more preferably 40 parts by mass or less, with respect to 100 parts by mass of the base rubber. If the amount of the co-crosslinking agent is less than 10 parts by mass, the amount of the crosslinking initiator must be increased to obtain an appropriate hardness, which tends to lower the resilience. On the other hand, if the amount of the co-crosslinking agent is more than 50 parts by mass, the core becomes so hard that the shot feeling may be lowered.

The core rubber composition preferably contains an organic sulfur compound. (f) The organic sulfur compound is not particularly limited, as long as it is an organic compound having a sulfur atom in the molecule thereof. Examples thereof include an organic compound having a thiol group (—SH) or a polysulfide bond having 2 to 4 sulfur atoms (—S—S—, —S—S—S—, or —S—S—S—S—); and a metal salt thereof (—SM, —S-M-S—, —S-M-S—S—, —S—S-M-S—S—, —S-M-S—S—S—, or the like; M is a metal atom). Examples of the metal salt include a salt of monovalent metal such as sodium, lithium, potassium, copper (I), and silver (I); and a salt of divalent metal such as zinc, magnesium, calcium, strontium, barium, titanium (II), manganese (II), iron (II), cobalt (II), nickel (II), zirconium (II), and tin (II). The organic sulfur compound may be any one of aliphatic compound (aliphatic thiol, aliphatic thiocarboxylic acid, aliphatic dithiocarboxylic acid, aliphatic polysulfide, or the like), heterocyclic compound, alicyclic compound (alicyclic thiol, alicyclic thiocarboxylic acid, alicyclic dithiocarboxylic acid, alicyclic polysulfide, or the like), and aromatic compound. Examples of the organic sulfur compound include thiols (thiophenols and thionaphthols), polysulfides, thiocarboxylic acids, dithiocarboxylic acids, sulfenamides, thiurams, dithiocarbamates, and thiazoles. The content of the organic sulfur compound is preferably 0.05 part by mass or more, more preferably 0.1 part by mass or more, and is preferably 5.0 parts by mass or less, more preferably 2.0 parts by mass or less, with respect to 100 parts by mass of the base rubber. If the content of the organic sulfur compound is less than 0.05 part by mass, the effect of adding the organic sulfur compound cannot be obtained, thus resilience of the golf ball may not be enhanced. If the content of the organic sulfur compound exceeds 5.0 parts by mass, the compression deformation amount of the obtained golf ball becomes large, thus resilience may be lowered.

The core rubber composition may further include additives such as a pigment, a filler for adjusting weight or the like, an antioxidant, a peptizing agent, and a softener, where necessary.

Examples of the pigment blended in the core rubber composition include a white pigment, a blue pigment, and a purple pigment. As the white pigment, titanium oxide is preferably used. The type of titanium oxide is not particularly limited, but rutile type is preferably used because of the high opacity. The content of titanium oxide is preferably 0.5 part by mass or more, more preferably 2 parts by mass or more, and is preferably 8 parts by mass or less, more preferably 5 parts by mass or less, with respect to 100 parts by mass of the base rubber.

It is also preferred that the core rubber composition contains both a white pigment and a blue pigment. The blue pigment is blended in order to cause white color to be vivid, and examples thereof include ultramarine blue, cobalt blue, and phthalocyanine blue. Examples of the purple pigment include anthraquinone violet, dioxazine violet, and methyl violet.

The content of the blue pigment is preferably 0.001 part by mass or more, and more preferably 0.05 part by mass or more, and is preferably 0.2 part by mass or less, and more preferably 0.1 part by mass or less, with respect to 100 parts by mass of the base rubber. If the content of the blue pigment is less than 0.001 part by mass, blueness is insufficient, and the color looks yellowish. If the content of the blue pigment exceeds 0.2 part by mass, blueness is excessively strong, and a vivid white appearance is not provided.

The filler blended in the core rubber composition is used as a weight adjusting agent for mainly adjusting the weight of the golf ball obtained as a final product, and may be blended where necessary. Examples of the filler include an inorganic filler such as zinc oxide, barium sulfate, calcium carbonate, magnesium oxide, tungsten powder, molybdenum powder, or the like. Among them, zinc oxide is most preferably used as the filler because zinc oxide is considered to function as a vulcanization aid for increasing the whole core hardness. The content of the filler is preferably 0.5 part by mass or more, more preferably 1 part by mass or more, and is preferably 30 parts by mass or less, more preferably 25 parts by mass or less, and even more preferably 20 parts by mass or less, with respect to 100 parts by mass of the base rubber. If the content of the filler is less than 0.5 part by mass, it is difficult to adjust the weight, while if the content of the filler exceeds 30 parts by mass, the weight fraction of the rubber component is reduced and thus the resilience tends to be lowered.

The content of the antioxidant is preferably 0.1 part by mass or more and 1 part by mass or less, with respect to 100 parts by mass of the base rubber. In addition, the content of the peptizing agent is preferably 0.1 part by mass or more and 5 parts by mass or less, with respect to 100 parts by mass of the base rubber.

The conditions for heat press molding the core rubber composition may be appropriately set according to the rubber formulation. Generally, the heat press molding is preferably carried out for 10 to 60 minutes at the temperature of 130° C. to 200° C. Alternatively, the heat press molding is preferably carried out in a two-step heating for 20 to 40 minutes at the temperature of 130° C. to 150° C., and continuously for 5 to 15 minutes at the temperature of 160° C. to 180° C.

The core preferably has a spherical shape. If the core is not spherical, the thickness of the intermediate layer or cover is not uniform. As a result, the performance of the intermediate layer or cover tends to be lowered partially.

The diameter of the core is preferably 34.8 mm or more, more preferably 36.8 mm or more, and even more preferably 38.8 mm or more, and is preferably 42.2 mm or less, more preferably 41.8 mm or less, even more preferably 41.2 mm or less, and most preferably 40.8 mm or less. If the diameter of the core is 34.8 mm or more, the thickness of the cover does not become too thick, and thus the resilience becomes better. On the other hand, if the diameter of the core is 42.2 mm or less, the thickness of the cover does not become too thin, and thus the cover functions better.

When the core has a diameter in a range from 34.8 mm to 42.2 mm, the compression deformation amount of the core (shrinking amount of the core along the compression direction) when applying a load from 98 N as an initial load to 1275 N as a final load to the core is preferably 2.0 mm or more, more preferably 2.8 mm or more, and is preferably 6.0 mm or less, more preferably 5.0 mm or less. If the compression deformation amount is 2.0 mm or more, the shot feeling of the golf ball becomes better. If the compression deformation amount is 6.0 mm or less, the resilience of the golf ball becomes better.

Examples of the intermediate layer material include a thermoplastic resin such as a polyurethane resin, ionomer resin, polyamide resin, and polyethylene; a thermoplastic elastomer such as a styrene elastomer, polyolefin elastomer, polyurethane elastomer, and polyester elastomer; and a hardened product of a rubber composition. Examples of the ionomer resin include a product prepared by neutralizing at least a part of carboxyl groups in a binary copolymer composed of ethylene and an $\alpha,\beta$-unsaturated carboxylic acid with a metal ion; and a product prepared by neutralizing at least a part of carboxyl groups in a ternary copolymer composed of ethylene, an $\alpha,\beta$-unsaturated carboxylic acid and an $\alpha,\beta$-unsaturated carboxylic acid ester with a metal ion. The intermediate layer may further include a density adjusting agent such as barium sulfate and tungsten, an antioxidant, a pigment or the like.

The method for molding the intermediate layer is not particularly limited, and includes a method which comprises molding the intermediate layer composition into a hemispherical half shell beforehand, covering the spherical body with two half shells and performing compression molding; and a method which comprises injection molding the intermediate layer composition directly onto the spherical body to cover the spherical body.

In the case of injection molding the intermediate layer composition directly onto the spherical body to obtain the intermediate layer, it is preferred to use upper and lower molds having a hemispherical cavity. When molding the intermediate layer by injection molding, the hold pin is protruded to hold the spherical body, and the intermediate layer composition which has been heated and melted is charged and then cooled to obtain the intermediate layer.

When molding the intermediate layer in the compression molding method, molding of the half shell can be performed by either compression molding method or injection molding method, and the compression molding method is preferred. Compression molding the intermediate layer composition into the half shell can be carried out, for example, under a pressure of 1 MPa or more and 20 MPa or less at a temperature of −20° C. or more and 70° C. or less relative to the flow beginning temperature of the intermediate layer composition. By performing the molding under the above conditions, a half shell having a uniform thickness can be formed. Examples of the method for molding the intermediate layer using half shells include a method of covering the spherical body with two half shells and performing compression molding. Compression molding the half shells into the intermediate layer can be carried out, for example, under a pressure of 0.5 MPa or more and 25 MPa or less at a temperature of −20° C. or more and 70° C. or less relative to the flow beginning temperature of the intermediate layer composition. By performing the molding under the above conditions, the intermediate layer having a uniform thickness can be formed.

The molding temperature means the highest temperature where the temperature at the surface of the concave portion of the lower mold reaches from closing the mold to opening the mold. Further, the flow beginning temperature of the thermoplastic resin composition can be measured in a pellet form under the following conditions by using "Flow Tester CFT-500" manufactured by Shimadzu Corporation.

Measuring conditions: Plunger Area: 1 cm$^2$, Die length: 1 mm, Die diameter: 1 mm, Load: 588.399 N, Start temperature: 30° C., and Temperature increase rate: 3° C./min.

The thickness of the intermediate layer is preferably 0.3 mm or more, more preferably 0.4 mm or more, and even more preferably 0.5 mm or more, and is preferably 2.5 mm or less, more preferably 2.4 mm or less, and even more preferably 2.3 mm or less. If the intermediate layer has a plurality of layers, it is preferred that the total thickness of the intermediate layers falls within the above range.

The slab hardness of the intermediate layer is preferably 30 or more, more preferably 35 or more, and even more preferably 40 or more, and is preferably 60 or less, more preferably 55 or less in Shore D hardness. If the slab hardness of the intermediate layer is 30 or more in Shore D hardness, the slab hardness is contributable to increasing the degree of the outer-hard inner-soft structure of the golf ball, thus the golf ball exhibits a high launch angle and low spin rate, and travels a larger distance. On the other hand, if the slab hardness of the intermediate layer is 60 or less in Shore D hardness, excellent shot feeling is achieved. Here, the slab hardness of the intermediate layer is a hardness of the intermediate layer composition that is molded into a sheet form, and is measured by the method described later.

Next, the cover used in the golf ball according to the present invention will be described. The cover may be obtained with the same method as the one for forming the above intermediate layer by using a cover composition. The cover material is not particularly limited, and examples thereof include an ionomer rein, polyurethane, polyamide, polyester, and polystyrene. Among them, polyurethane and the ionomer rein are preferable.

Specific examples of the cover material include: an ionomer resin having a trade name of "Himilan (registered trademark) commercially available from Du Pont-Mitsui Polychemicals Co., Ltd.; a thermoplastic polyurethane elastomer having a trade name of "Elastollan (registered trademark)" commercially available from BASF Japan Ltd; a thermoplastic polyamide elastomer having a trade name of "Pebax (registered trademark)" commercially available from Arkema K. K.; a thermoplastic polyester elastomer having a trade name of "Hytrel (registered trademark)" commercially available from Du Pont-Toray Co., Ltd.; and a thermoplastic styrene elastomer having a trade name of "Rabalon (registered trademark)" or a thermoplastic polyester elastomer having a trade name of "Primalloy (registered trademark)" commercially available from Mitsubishi Chemical Corporation. The cover material may be used solely or at least two of them may be used in combination.

In addition to the above resin component, the cover composition may further contain a pigment component such as a white pigment (for example, titanium oxide), a blue pigment, and a red pigment; a weight adjusting agent such as zinc oxide, calcium carbonate, and barium sulfate; a dispersant; an antioxidant; an ultraviolet absorber; a light stabilizer; a fluorescent material or a fluorescent brightener; and the like, as long as they do not impair the performance of the cover.

The content of the white pigment (for example, titanium oxide) is preferably 0.5 part by mass or more, and more preferably 1 part by mass or more, and is preferably 10 parts by mass or less, and more preferably 8 parts by mass or less with respect to 100 parts by mass of the resin component constituting the cover. If the content of the white pigment is 0.5 part by mass or more, it is possible to impart the opacity to the resultant cover. Further, if the content of the white pigment is more than 10 parts by mass, the durability of the resultant cover may deteriorate.

The slab hardness of the cover composition is preferably set in accordance with the desired performance of the golf ball. For example, in case of a so-called distance golf ball which focuses on a flight distance, the cover composition preferably has a slab hardness of 50 or more, more preferably 55 or more, and preferably has a slab hardness of 80 or less, more preferably 70 or less in Shore D hardness. If the cover composition has a slab hardness of 50 or more, the obtained golf ball has a high launch angle and low spin rate on driver shots and iron shots, and thus the flight distance becomes large. If the cover composition has a slab hardness of 80 or less, the golf ball excellent in durability is obtained. Further, in case of a so-called spin golf ball which focuses on controllability, the cover composition preferably has a slab hardness of less than 50, and preferably has a slab hardness of 20 or more, more preferably 25 or more in Shore D hardness. If the cover composition has a slab hardness of less than 50, the spin rate of the golf ball on approach shots increases, and if the cover composition has a slab hardness of 20 or more, the abrasion resistance thereof is enhanced.

The embodiment for molding the cover from the cover composition is not particularly limited, and includes an embodiment which comprises injection molding the cover composition directly onto the core, or an embodiment which comprises molding the cover composition into a hollow shell, covering the core with a plurality of the hollow shells and performing compression molding (preferably an embodiment which comprises molding the cover composition into a hollow half-shell, covering the core with two of the half-shells and performing compression molding). After the cover is molded, the golf ball body is ejected from the mold, and is preferably subjected to surface treatments such as deburring, cleaning and sandblast where necessary. If desired, a mark may be formed.

The thickness of the cover is preferably 4.0 mm or less, more preferably 3.0 mm or less, and even more preferably 2.0 mm or less. If the thickness of the cover is 4.0 mm or less, the obtained golf ball exhibits better resilience and shot feeling. The thickness of the cover is preferably 0.3 mm or more, more preferably 0.5 mm or more, even more preferably 0.8 mm or more, and most preferably 1.0 mm or more. If the thickness of the cover is less than 0.3 mm, the durability and wear resistance of the cover may deteriorate.

The concave portions called "dimple" are usually formed on the surface of the cover when forming the cover. The total number of dimples is preferably 200 or more and 500 or less. If the total number of dimples is less than 200, the dimple effect is hardly obtained. On the other hand, if the total number of dimples exceeds 500, the dimple effect is hardly obtained because the size of the respective dimple is small. The shape (shape in a plan view) of dimples includes, without limitation, a circle; a polygonal shape such as a roughly triangular shape, a roughly quadrangular shape, a roughly pentagonal shape, a roughly hexagonal shape; or other irregular shape. The shape of dimples is employed solely or in combination of at least two of them.

After the cover is molded, the obtained golf ball is ejected from the mold, and is preferably subjected to surface treatments such as deburring, cleaning and sandblast where necessary. If desired, a paint film or a mark may be formed. The paint film preferably has a thickness of, but not limited to, 5 μm or larger, and more preferably 7 μm or larger, and preferably has a thickness of 50 μm or smaller, more preferably 40 μm or smaller, even more preferably 30 μm or smaller. If the thickness of the paint film is smaller than 5 μm, the paint film is easy to wear off due to continued use of the golf ball, and if the thickness of the paint film is larger than 50 μm, the dimple effect is reduced, resulting in lowering flying performance of the golf ball.

The golf ball preferably has a diameter ranging from 40 mm to 45 mm. In light of satisfying the regulation of US Golf Association (USGA), the diameter is most preferably 42.67 mm or more. In light of prevention of air resistance, the diameter is more preferably 44 mm or less, and most preferably 42.80 mm or less. In addition, the golf ball preferably has a mass of 40 g or more and 50 g or less. In light of obtaining greater inertia, the mass is more preferably 44 g or more, and most preferably 45.00 g or more. In light of satisfying the regulation of USGA, the mass is most preferably 45.93 g or less.

When the golf ball has a diameter in a range from 40 mm to 45 mm, the compression deformation amount (shrinking amount of the golf ball along the compression direction) of the golf ball when applying a load from 98 N as an initial load to 1275 N as a final load to the golf ball is preferably 2.0 mm or more, more preferably 2.4 mm or more, even more preferably 2.5 mm or more, and most preferably 2.8 mm or more, and is preferably 5.0 mm or less, and more preferably 4.5 mm or less. If the compression deformation amount is 2.0 mm or more, the golf ball is not excessively hard, so the shot feeling thereof becomes better. On the other hand, if the compression deformation amount is 5.0 mm or less, the resilience of the golf ball becomes better.

Figure 2:
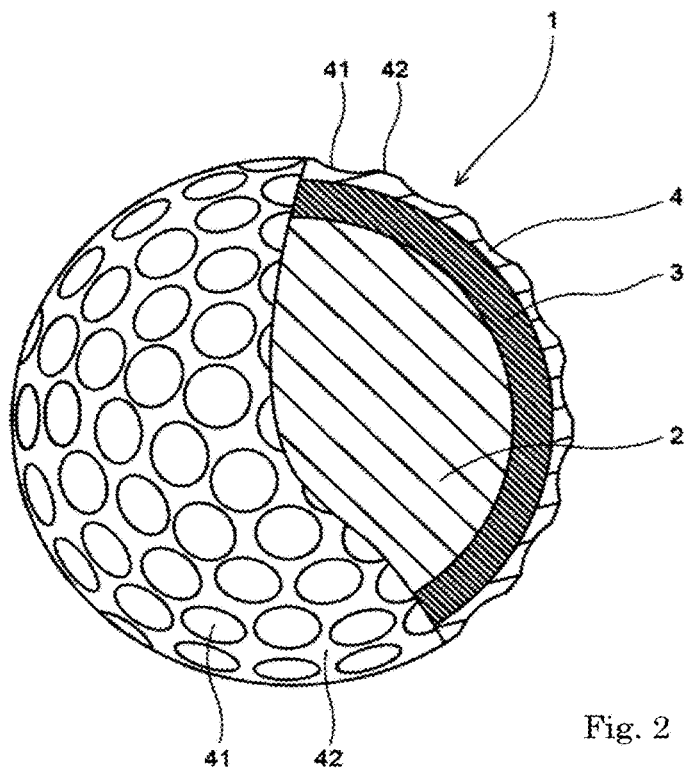
FIG. 2 is a partially cutaway view of a golf ball of one embodiment according to the present invention.

FIG. 2 is a partially cutaway view of a golf ball 1 of one embodiment according to the present invention. The golf ball 1 comprises a spherical core 2, an intermediate layer 3 disposed on the outer side of the spherical core 2, and a cover 4 disposed on the outer side of the intermediate layer 3. A plurality of dimples 41 are formed on the surface of the cover 4. Other portions than dimples 41 on the surface of the cover 4 are land 42. The intermediate layer 3 is formed from the above-described golf ball resin composition.

EXAMPLES

Hereinafter, the present invention will be described in detail by way of example. The present invention is not limited to examples described below. Various changes and modifications can be made without departing from the spirit and scope of the present invention.

[Evaluation Method]
(1) Slab Hardness (Shore D Hardness)

Sheets with a thickness of about 2 mm were produced by heat press molding the golf ball resin composition. The sheets were stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.

(2) Bending Stiffness (kgf/cm$^2$)

Test pieces with a thickness of about 2 mm, a width of 20 mm and a length of 100 mm were produced by heat press molding the golf ball resin composition at 190° C. for 10 minutes. The bending stiffness at the bending angle from 3° to 12°, the bending stiffness at the bending angle from 12° to 15°, the bending stiffness at the bending angle from 24° to 30°, and the bending stiffness at the bending angle from 36° to 39° of the obtained test pieces were measured with Olsen stiffness tester (manufactured by Toyo Seiki Seisakusho, Ltd.). Specifically, load scales at predetermined bending angles were measured, the bending angles (°) were plotted in the horizontal axis and the load scale readings were plotted in the vertical axis to obtain a linear approximation curve, and the slope of approximation curve was calculated. Measurement was performed at the temperature of 23° C. plus or minus 2° C., relative humidity of 50 plus or minus 5%, bending speed of 60°/min, and distance between fulcrums of 50 mm. The bending stiffness was obtained by multiplying the slope value by 8.7078 and then dividing the obtained product by the cube of thickness (cm) of the test piece. It is noted that, as the bending stiffness at the bending angle from 3° to 12°, the load scales at the bending angles of 3°, 6°, 9° and 12° were measured; as the bending stiffness at the bending angle from 12° to 15°, the load scales at the bending angles of 12° and 15° were measured; as the bending stiffness at the bending angle from 24° to 30°, the load scales at the bending angles of 24°, 27° and 30° were measured; and as the bending stiffness at the bending angle from 36° to 39°, the load scales at the bending angles of 36° and 39° were measured.

(3) Compression Deformation Amount (Mm)

The compression deformation amount of the golf ball along the compression direction (shrinking amount of the golf ball along the compression direction), when applying a load from 98 N as an initial load to 1275 N as a final load to the golf ball, was measured.

(4) Coefficient of Restitution

A metal cylindrical object with a mass of 198.4 g was allowed to collide with the golf ball at a speed of 40 m/sec, and the speeds of the cylindrical object and the golf ball before and after the collision were measured. Based on these speeds and the mass of each object, coefficient of restitution for each golf ball was calculated. The measurement was conducted by using twelve samples for each golf ball, and the average value was regarded as the coefficient of restitution for the golf ball.

(5) Shot Feeling

An actual hitting test was carried out by ten amateur golfers (high skilled person) using a driver. Feeling at the shot was evaluated by each person according to the following criteria. Major result of the evaluations of ten golfers was employed as the result of the golf ball.

E (Excellent): Impact is small and feeling is good.
G (Good): Normal feeling.
P (Poor): Impact is large and feeling is poor.

[Production of Golf Ball]
(1) Production of Spherical Core

The core rubber compositions having the formulations shown in Table 1 were kneaded with a kneading roller, and then heat-pressed in upper and lower molds, each having a hemispherical cavity, at 170° C. for 20 minutes to obtain spherical cores having a diameter of 39.8 mm.

TABLE 1

| Core composition formulation | Parts by mass |
| --- | --- |
| Polybutadiene rubber | 100 |
| Zinc acrylate | 30 |
| Thionaphthol | 0.2 |
| Dicumyl peroxide | 0.5 |

Polybutadiene rubber: "BR730 (cis-bond content: 95 mass %)" manufactured by JSR Corporation
Zinc acrylate: manufactured by Sigma-Aldrich Corporation
Dicumyl peroxide: manufactured by Tokyo Chemical Industry Co., Ltd.
Thionaphthol: manufactured by Tokyo Chemical Industry Co., Ltd.

(2) Production of Intermediate Layer

Golf Balls No. 1-1 to 1-16, No. 2-1 to 2-12, 4-1 to 4-6, and No. 5-1

According to the formulations shown in Tables 2 to 5, all the components except (B) component were charged into a kneader and kneaded at 220° C. for 15 minutes. Then, (B) component was charged therein and further kneaded at 200° C. for 10 minutes to prepare golf ball resin compositions. The obtained golf ball material was charged into each concave portion of the lower mold of the mold which is used for molding the half shell, and compression was performed to form the half shell. Compression molding was conducted at the molding temperature of 170° C., the molding time of 5 minutes, and the molding pressure of 2.94 MPa. The spherical core obtained by (1) was concentrically covered with two half shells, and compression was performed to form the intermediate layer with a thickness of 1 mm. Compression molding was conducted at the molding temperature of 170° C., and the molding time of 15 minutes.

Golf Balls No. 3-1 to 3-18, and No. 5-2

According to the formulations shown in Tables 6 to 8, the component (A), component (C), component (D) and component (E) were charged into a kneader and kneaded at 220° C. for 15 minutes. Then, (B) component was charged therein and further kneaded at 180° C. for 10 minutes to prepare golf ball resin compositions, and the obtained golf ball resin compositions were pelletized with an extruder. The obtained golf ball resin composition pellets were charged into each concave portion of the lower mold of the mold which is used for molding the half shell, and compression was performed to form the half shell. The spherical core was concentrically covered with two half shells, and compression was performed to form the intermediate layer with a thickness of 1 mm. Compression molding was conducted at the molding temperature of 170° C., and the molding time of 15 minutes.

TABLE 2

| | | | Golf ball No. | 1-1 | 1-2 | 1-3 | 1-4 | 1-5 | 1-6 |
|---|---|---|---|---|---|---|---|---|---|
| Golf ball resin composition (formulation: parts by mass) | A | | Binary copolymer 1 | 100 | 100 | 100 | 100 | 100 | 100 |
| | B | | VGCF-H | 1 | 5 | 10 | 15 | 20 | 25 |
| | | | TISMO D | — | — | — | — | — | — |
| | | | Celasule BMI | — | — | — | — | — | — |
| | C | | Oleyl betaine | 60 | 60 | 60 | 60 | 60 | 60 |
| | D | | Oleic acid | 90 | 90 | 90 | 90 | 90 | 90 |
| | E | | Magnesium hydroxide | 18.2 | 18.2 | 18.2 | 18.2 | 18.2 | 18.2 |
| | | | Sodium hydroxide | — | — | — | — | — | — |
| | | | Zinc oxide | — | — | — | — | — | — |
| | | | Calcium hydroxide | — | — | — | — | — | — |
| | | | Total neutralization degree (mole %) | 127 | 127 | 127 | 127 | 127 | 127 |
| Material properties | Slab hardness (Shore D) | | | 49 | 50 | 51 | 52 | 52 | 53 |
| | Bending stiffness | $M_{3-12}$ (kgf/cm$^2$) | | 802 | 904 | 1103 | 1412 | 1756 | 2164 |
| | | $M_{12-15}$ (kgf/cm$^2$) | | 822 | 916 | 1276 | 1665 | 1858 | 2346 |
| | | $M_{24-30}$ (kgf/cm$^2$) | | 772 | 858 | 1108 | 1553 | 1564 | 1623 |
| | | $M_{36-39}$ (kgf/cm$^2$) | | 761 | 811 | 1090 | 1540 | 1486 | 1537 |
| | | $M_{3-12}/M_{24-30}$ | | 1.04 | 1.05 | 1.00 | 0.91 | 1.12 | 1.33 |
| | | $M_{12-15}/M_{36-39}$ | | 1.08 | 1.13 | 1.17 | 1.08 | 1.25 | 1.53 |
| | Aggregate is formed or not | | | Yes | Yes | Yes | Yes | Yes | Yes |
| | Average long diameter of aggregate (μm) | | | 0.8 | 0.8 | 1.2 | 1.8 | 2.4 | 2.8 |
| | Content of aggregate (volume %) | | | 0.8 | 5.1 | 10.2 | 20.3 | 26.8 | 41.1 |
| Ball evaluation | Compression deformation amount (mm) | | | 3.7 | 3.6 | 3.5 | 3.4 | 3.4 | 3.1 |
| | Coefficient of Restitution | | | 0.833 | 0.852 | 0.866 | 0.871 | 0.861 | 0.849 |
| | Shot feeling | | | E | E | E | E | E | E |

| | | | Golf ball No. | 1-7 | 1-8 | 1-9 | 1-10 | 1-11 |
|---|---|---|---|---|---|---|---|---|
| Golf ball resin composition (formulation: parts by mass) | A | | Binary copolymer 1 | 100 | 100 | 100 | 100 | 100 |
| | B | | VGCF-H | — | — | 20 | 20 | 20 |
| | | | TISMO D | 20 | — | — | — | — |
| | | | Celasule BMI | — | 20 | — | — | — |
| | C | | Oleyl betaine | 60 | 60 | 60 | 60 | 60 |
| | D | | Oleic acid | 90 | 90 | 90 | 90 | 90 |
| | E | | Magnesium hydroxide | 18.2 | 18.2 | — | — | — |
| | | | Sodium hydroxide | — | — | 25.3 | — | — |
| | | | Zinc oxide | — | — | — | 25.3 | — |
| | | | Calcium hydroxide | — | — | — | — | 23.2 |
| | | | Total neutralization degree (mole %) | 127 | 127 | 129 | 127 | 127 |
| Material properties | Slab hardness (Shore D) | | | 53 | 52 | 52 | 53 | 54 |
| | Bending stiffness | $M_{3-12}$ (kgf/cm$^2$) | | 1656 | 1847 | 1807 | 1784 | 1906 |
| | | $M_{12-15}$ (kgf/cm$^2$) | | 1718 | 1682 | 1875 | 1811 | 2047 |
| | | $M_{24-30}$ (kgf/cm$^2$) | | 1474 | 1445 | 1609 | 1588 | 1597 |
| | | $M_{36-39}$ (kgf/cm$^2$) | | 1081 | 1148 | 1506 | 1392 | 1428 |
| | | $M_{3-12}/M_{24-30}$ | | 1.12 | 1.28 | 1.12 | 1.12 | 1.19 |
| | | $M_{12-15}/M_{36-39}$ | | 1.59 | 1.47 | 1.25 | 1.30 | 1.43 |
| | Aggregate is formed or not | | | No | No | Yes | Yes | Yes |
| | Average long diameter of aggregate (μm) | | | 2.2 | 2.6 | 2.1 | 1.9 | 1.8 |
| | Content of aggregate (volume %) | | | 24.1 | 21.0 | 22.8 | 19.7 | 20.3 |
| Ball evaluation | Compression deformation amount (mm) | | | 3.2 | 3.1 | 3.2 | 3.1 | 3.0 |
| | Coefficient of Restitution | | | 0.801 | 0.798 | 0.851 | 0.833 | 0.821 |
| | Shot feeling | | | E | E | E | E | E |

TABLE 3

| Golf ball No. | | | 1-12 | 1-13 | 1-14 | 1-15 | 1-16 | 4-1 |
|---|---|---|---|---|---|---|---|---|
| Golf ball resin composition (formulation: parts by mass) | A | Binary copolymer 1 | — | — | 100 | 100 | 100 | 100 |
| | | Ternary copolymer 1 | 100 | — | — | — | — | — |
| | | Binary copolymer 2 | — | 100 | — | — | — | — |
| | B | VGCF-H | 20 | 20 | 20 | 20 | 20 | — |
| | | Silica powder | — | — | — | — | — | 20 |
| | | Graphite powder | — | — | — | — | — | — |
| | C | Oleyl betaine | 60 | 60 | 60 | 60 | 60 | 60 |
| | D | Oleic acid | 90 | 90 | 90 | 90 | 90 | 90 |
| | E | Magnesium hydroxide | 15.6 | 20.4 | 4.7 | 10.5 | 33.7 | 18.2 |
| | | Total neutralization degree (mole %) | 130 | 127 | 33 | 73 | 235 | 127 |
| Material properties | Slab hardness (Shore D) | | 49 | 55 | 48 | 51 | 54 | 63 |
| | Bending stiffness | $M_{3-12}$ (kgf/cm$^2$) | 1352 | 1917 | 1286 | 1723 | 2015 | 3361 |
| | | $M_{24-30}$ (kgf/cm$^2$) | 1204 | 1707 | 1195 | 1494 | 1734 | 1464 |
| | | $M_{12-15}$ (kgf/cm$^2$) | 1439 | 1840 | 1340 | 1825 | 2217 | 3359 |
| | | $M_{36-39}$ (kgf/cm$^2$) | 1267 | 1528 | 1124 | 1458 | 1527 | 1015 |
| | | $M_{3-12}/M_{24-30}$ | 1.12 | 1.12 | 1.08 | 1.15 | 1.16 | 2.30 |
| | | $M_{12-15}/M_{36-39}$ | 1.14 | 1.20 | 1.19 | 1.25 | 1.45 | 3.31 |
| | Aggregate is formed or not | | Yes | Yes | Yes | Yes | Yes | No |
| | Average long diameter of aggregate (μm) | | 2.3 | 2.2 | 2.2 | 2.3 | 2.3 | — |
| | Content of aggregate (volume %) | | 25.2 | 24.9 | 18.4 | 22.5 | 25.1 | — |
| Ball evaluation | Compression deformation amount (mm) | | 3.7 | 3.1 | 3.4 | 3.1 | 3.1 | 2.2 |
| | Coefficient of Restitution | | 0.838 | 0.853 | 0.861 | 0.853 | 0.834 | 0.651 |
| | Shot feeling | | E | E | E | E | E | P |

| Golf ball No. | | | 4-2 | 1-17 | 1-18 | 5-1 |
|---|---|---|---|---|---|---|
| Golf ball resin composition (formulation: parts by mass) | A | Binary copolymer 1 | 100 | 100 | 100 | 100 |
| | | Ternary copolymer 1 | — | — | — | — |
| | | Binary copolymer 2 | — | — | — | — |
| | B | VGCF-H | — | 20 | 20 | — |
| | | Silica powder | — | — | — | — |
| | | Graphite powder | 20 | — | — | — |
| | C | Oleyl betaine | 60 | 60 | — | 60 |
| | D | Oleic acid | 90 | — | 90 | 90 |
| | E | Magnesium hydroxide | 18.2 | 7.0 | 18.2 | 18.2 |
| | | Total neutralization degree (mole %) | 127 | 127 | 127 | 127 |
| Material properties | Slab hardness (Shore D) | | 61 | 45 | 61 | 46 |
| | Bending stiffness | $M_{3-12}$ (kgf/cm$^2$) | 2665 | 924 | 1914 | 510 |
| | | $M_{24-30}$ (kgf/cm$^2$) | 1004 | 711 | 1436 | 483 |
| | | $M_{12-15}$ (kgf/cm$^2$) | 2661 | 935 | 1861 | 507 |
| | | $M_{36-39}$ (kgf/cm$^2$) | 857 | 557 | 1276 | 483 |
| | | $M_{3-12}/M_{24-30}$ | 2.65 | 1.30 | 1.33 | 1.06 |
| | | $M_{12-15}/M_{36-39}$ | 3.11 | 1.68 | 1.46 | 1.05 |
| | Aggregate is formed or not | | No | Yes | Yes | No |
| | Average long diameter of aggregate (μm) | | — | 1.9 | 2.1 | — |
| | Content of aggregate (volume %) | | — | 20.6 | 23.1 | — |
| Ball evaluation | Compression deformation amount (mm) | | 2.4 | 3.6 | 3.0 | 3.8 |
| | Coefficient of Restitution | | 0.620 | 0.801 | 0.814 | 0.628 |
| | Shot feeling | | P | E | E | E |

TABLE 4

| Golf ball No. | | | 2-1 | 2-2 | 2-3 | 2-4 | 2-5 | 2-6 | 2-7 |
|---|---|---|---|---|---|---|---|---|---|
| Golf ball resin composition (formulation: parts by mass) | A | Binary copolymer 1 | 100 | 100 | 100 | 100 | 100 | 100 | 100 |
| | | Ternary copolymer 1 | — | — | — | — | — | — | — |
| | | Binary copolymer 2 | — | — | — | — | — | — | — |
| | B | PCF7620A | 5 | 15 | 20 | 25 | 20 | 20 | 20 |
| | C | Oleyl betaine | 60 | 60 | 60 | 60 | 60 | 60 | 60 |
| | D | Oleic acid | 90 | 90 | 90 | 90 | 90 | 90 | 90 |
| | E | Magnesium hydroxide | 18.2 | 18.2 | 18.2 | 18.2 | — | — | — |
| | | Sodium hydroxide | — | — | — | — | 25.3 | — | — |
| | | Zinc oxide | — | — | — | — | — | 25.3 | — |
| | | Calcium hydroxide | — | — | — | — | — | — | 23.2 |
| | | Total neutralization degree (mole %) | 127 | 127 | 127 | 127 | 129 | 127 | 127 |
| Material properties | Slab hardness (Shore D) | | 50 | 52 | 52 | 53 | 52 | 53 | 53 |
| | Bending stiffness | $M_{3-12}$ (kgf/cm$^2$) | 2515 | 2894 | 2961 | 3240 | 3047 | 3154 | 3302 |
| | | $M_{24-30}$ (kgf/cm$^2$) | 2205 | 2391 | 2438 | 2490 | 2414 | 2536 | 2583 |
| | | $M_{3-12}/M_{24-30}$ | 1.14 | 1.21 | 1.21 | 1.30 | 1.26 | 1.24 | 1.28 |
| Ball evaluation | Compression deformation amount (mm) | | 3.6 | 3.4 | 3.4 | 3.0 | 3.2 | 3.0 | 3.0 |
| | Coefficient of Restitution | | 0.873 | 0.888 | 0.861 | 0.828 | 0.842 | 0.830 | 0.811 |
| | Shot feeling | | E | E | E | E | E | E | E |

TABLE 5

| | | Golf ball No. | 2-8 | 2-9 | 2-10 | 2-11 | 2-12 | 4-3 | 4-4 | 4-1 | 4-2 |
|---|---|---|---|---|---|---|---|---|---|---|---|
| Golf ball resin composition (formulation: parts by mass) | A | Binary copolymer 1 | — | — | 100 | 100 | 100 | 100 | 100 | 100 | 100 |
| | | Ternary copolymer 1 | 100 | — | — | — | — | — | — | — | — |
| | | Binary copolymer 2 | — | 100 | — | — | — | — | — | — | — |
| | B | PCF7620A | 20 | 20 | 20 | 20 | 20 | — | — | — | — |
| | | Aluminum powder | — | — | — | — | — | 20 | — | — | — |
| | | Neutral alumina powder | — | — | — | — | — | — | 20 | — | — |
| | | Silica powder | — | — | — | — | — | — | — | 20 | — |
| | | Graphite powder | — | — | — | — | — | — | — | — | 20 |
| | C | Oleyl betaine | 60 | 60 | 60 | 60 | 60 | 60 | 60 | 60 | 60 |
| | D | Oleic acid | 90 | 90 | 90 | 90 | 90 | 90 | 90 | 90 | 90 |
| | | Total neutralization degree (mole %) | 130 | 127 | 33 | 73 | 235 | 127 | 127 | 127 | 127 |
| Material properties | | Slab hardness (Shore D) | 48 | 56 | 50 | 51 | 54 | 61 | 60 | 63 | 61 |
| | | Bending stiffness $M_{3-12}$ (kgf/cm²) | 2021 | 3412 | 2667 | 2791 | 3126 | 3151 | 3264 | 3361 | 2665 |
| | | Bending stiffness $M_{24-30}$ (kgf/cm²) | 1748 | 2516 | 2086 | 2404 | 2411 | 1327 | 1207 | 1464 | 1004 |
| | | $M_{3-12}/M_{24-30}$ | 1.16 | 1.36 | 1.28 | 1.16 | 1.30 | 2.37 | 2.70 | 2.30 | 2.65 |
| Ball evaluation | | Compression deformation amount (mm) | 3.7 | 3.0 | 3.6 | 3.4 | 3.1 | 2.3 | 2.5 | 2.2 | 2.4 |
| | | Coefficient of Restitution | 0.848 | 0.822 | 0.853 | 0.868 | 0.834 | 0.663 | 0.676 | 0.651 | 0.620 |
| | | Shot feeling | E | E | E | E | E | P | P | P | P |

TABLE 6

| | | | Golf ball No. | 3-1 | 4-5 | 4-3 | 4-4 | 4-1 | 4-6 |
|---|---|---|---|---|---|---|---|---|---|
| Golf ball resin composition | Formulation (parts by mass) | A | Binary copolymer 1 | 100.0 | 100.0 | 100.0 | 100.0 | 100.0 | 100.0 |
| | | B | Rap dGO (graphene oxide) | 20.0 | — | — | — | — | — |
| | | | iGurafen | — | 20.0 | — | — | — | — |
| | | | Aluminum powder | — | — | 20.0 | — | — | — |
| | | | Neutral alumina powder | — | — | — | 20.0 | — | — |
| | | | Silica powder | — | — | — | — | 20.0 | — |
| | | | Sulfonic acid modified fullerene | — | — | — | — | — | 20.0 |
| | | | Graphite powder | — | — | — | — | — | — |
| | | C | Oleyl betaine | 60.0 | 60.0 | 60.0 | 60.0 | 60.0 | 60.0 |
| | | D | Oleic acid | 90.0 | 90.0 | 90.0 | 90.0 | 90.0 | 90.0 |
| | | E | Magnesium hydroxide | 18.2 | 18.2 | 18.2 | 18.2 | 18.2 | 18.2 |
| | Properties | | Equivalence ratio | 1.20 | 1.20 | 1.20 | 1.20 | 1.20 | 1.20 |
| | | | Slab hardness (Shore D) | 51 | 60 | 61 | 60 | 63 | 59 |
| | | | Bending stiffness $M_{3-12}$ (kgf/cm²) | 2639 | 2936 | 3151 | 3264 | 3361 | 2452 |
| | | | Bending stiffness $M_{24-30}$ (kgf/cm²) | 2269 | 1293 | 1327 | 1207 | 1464 | 1195 |
| | | | $M_{3-12}/M_{24-30}$ | 1.16 | 2.27 | 2.37 | 2.70 | 2.30 | 2.05 |
| | | | Melt flow rate (g/10 min) (190° C., 2.16 kgf) | 2.1 | 2.5 | 2.4 | 2.3 | 2.3 | 2.2 |
| Ball evaluation | | | Compression deformation amount (mm) | 3.3 | 3.0 | 2.3 | 2.5 | 2.2 | 2.5 |
| | | | Coefficient of Restitution | 0.843 | 0.672 | 0.663 | 0.676 | 0.651 | 0.634 |
| | | | Shot feeling | E | G | P | P | P | G |

| | | | Golf ball No. | 4-2 | 3-2 | 3-3 | 3-4 |
|---|---|---|---|---|---|---|---|
| Golf ball resin composition | Formulation (parts by mass) | A | Binary copolymer 1 | 100.0 | 100.0 | 100.0 | 100.0 |
| | | B | Rap dGO (graphene oxide) | — | 5.0 | 15.0 | 25.0 |
| | | | iGurafen | — | — | — | — |
| | | | Aluminum powder | — | — | — | — |
| | | | Neutral alumina powder | — | — | — | — |
| | | | Silica powder | — | — | — | — |
| | | | Sulfonic acid modified fullerene | — | — | — | — |
| | | | Graphite powder | 20.0 | — | — | — |
| | | C | Oleyl betaine | 60.0 | 60.0 | 60.0 | 60.0 |
| | | D | Oleic acid | 90.0 | 90.0 | 90.0 | 90.0 |
| | | E | Magnesium hydroxide | 18.2 | 18.2 | 18.2 | 18.2 |
| | Properties | | Equivalence ratio | 1.20 | 1.20 | 1.20 | 1.20 |
| | | | Slab hardness (Shore D) | 61 | 50 | 51 | 53 |
| | | | Bending stiffness $M_{3-12}$ (kgf/cm²) | 2665 | 2401 | 2536 | 2938 |
| | | | Bending stiffness $M_{24-30}$ (kgf/cm²) | 1004 | 2115 | 2186 | 2583 |
| | | | $M_{3-12}/M_{24-30}$ | 2.65 | 1.14 | 1.16 | 1.14 |
| | | | Melt flow rate (g/10 min) (190° C., 2.16 kgf) | 2.5 | 2.3 | 2.2 | 1.7 |

TABLE 6-continued

| | | | | | | |
|---|---|---|---|---|---|---|
| Ball evaluation | Compression deformation amount (mm) | 2.4 | 3.6 | 3.4 | 3.0 |
| | Coefficient of Restitution | 0.620 | 0.827 | 0.835 | 0.814 |
| | Shot feeling | P | E | E | E |

TABLE 7

| | | | | Golf ball No. | 3-5 | 3-6 | 3-7 | 3-8 | 3-9 |
|---|---|---|---|---|---|---|---|---|---|
| Golf ball resin composition | Formulation (parts by mass) | A | Binary copolymer 1 | 100.0 | 100.0 | 100.0 | 100.0 | 100.0 |
| | | | Ternary copolymer 1 | — | — | — | — | — |
| | | | Binary copolymer 2 | — | — | — | — | — |
| | | B | Rap dGO (graphene oxide) | — | — | — | — | 20.0 |
| | | | iGurafen-Σ (surface treated graphene) | 20.0 | — | — | — | — |
| | | | Graphene having carboxyl group | — | 20.0 | — | — | — |
| | | | Graphene having hydroxyl group | — | — | 20.0 | — | — |
| | | | Graphene having amino group | — | — | — | 20.0 | — |
| | | C | Oleyl betaine | 60.0 | 60.0 | 60.0 | 60.0 | 60.0 |
| | | D | Oleic acid | 90.0 | 90.0 | 90.0 | 90.0 | 90.0 |
| | | E | Magnesium hydroxide | 18.2 | 18.2 | 18.2 | 18.2 | — |
| | | | Sodium hydroxide | — | — | — | — | 25.3 |
| | | | Zinc oxide | — | — | — | — | — |
| | | | Calcium hydroxide | — | — | — | — | — |
| Golf ball resin composition | Properties | | Equivalence ratio | 1.20 | 1.20 | 1.20 | 1.20 | 1.20 |
| | | | Slab hardness (Shore D) | 52 | 53 | 54 | 52 | 52 |
| | | | Bending stiffness $M_{3-12}$ (kgf/cm$^2$) | 2825 | 2940 | 3129 | 3394 | 3196 |
| | | | Bending stiffness $M_{24-30}$ (kgf/cm$^2$) | 2439 | 2521 | 2732 | 2934 | 2209 |
| | | | $M_{3-12}/M_{24-30}$ | 1.16 | 1.17 | 1.15 | 1.16 | 1.45 |
| | | | Melt flow rate (g/10 min) (190° C., 2.16 kgf) | 2.3 | 2.0 | 2.3 | 1.6 | 2.8 |
| Ball evaluation | | | Compression deformation amount (mm) | 3.4 | 3.3 | 3.6 | 3.5 | 3.3 |
| | | | Coefficient of Restitution | 0.841 | 0.832 | 0.821 | 0.833 | 0.835 |
| | | | Shot feeling | E | E | E | E | E |

| | | | | Golf ball No. | 3-10 | 3-11 | 3-12 | 3-13 |
|---|---|---|---|---|---|---|---|---|
| Golf ball resin composition | Formulation (parts by mass) | A | Binary copolymer 1 | 100.0 | 100.0 | — | — |
| | | | Ternary copolymer 1 | — | — | 100.0 | — |
| | | | Binary copolymer 2 | — | — | — | 100.0 |
| | | B | Rap dGO (graphene oxide) | 20.0 | 20.0 | 20.0 | 20.0 |
| | | | iGurafen-Σ (surface treated graphene) | — | — | — | — |
| | | | Graphene having carboxyl group | — | — | — | — |
| | | | Graphene having hydroxyl group | — | — | — | — |
| | | | Graphene having amino group | — | — | — | — |
| | | C | Oleyl betaine | 60.0 | 60.0 | 60.0 | 60.0 |
| | | D | Oleic acid | 90.0 | 90.0 | 90.0 | 90.0 |
| | | E | Magnesium hydroxide | — | — | 15.6 | 20.4 |
| | | | Sodium hydroxide | — | — | — | — |
| | | | Zinc oxide | 25.3 | — | — | — |
| | | | Calcium hydroxide | — | 23.2 | — | — |
| Golf ball resin composition | Properties | | Equivalence ratio | 1.20 | 1.20 | 1.20 | 1.20 |
| | | | Slab hardness (Shore D) | 52 | 54 | 49 | 56 |
| | | | Bending stiffness $M_{3-12}$ (kgf/cm$^2$) | 3176 | 3265 | 2476 | 3219 |
| | | | Bending stiffness $M_{24-30}$ (kgf/cm$^2$) | 2358 | 2338 | 2193 | 2835 |
| | | | $M_{3-12}/M_{24-30}$ | 1.35 | 1.40 | 1.13 | 1.14 |
| | | | Melt flow rate (g/10 min) (190° C., 2.16 kgf) | 2.4 | 1.4 | 2.7 | 1.2 |
| Ball evaluation | | | Compression deformation amount (mm) | 3.2 | 3.0 | 3.8 | 3.2 |
| | | | Coefficient of Restitution | 0.829 | 0.818 | 0.838 | 0.812 |
| | | | Shot feeling | E | E | E | E |

TABLE 8

| | | | | Golf ball No. | 3-14 | 3-15 | 3-16 | 3-17 | 3-18 | 5-2 |
|---|---|---|---|---|---|---|---|---|---|---|
| Golf ball resin composition | Formulation (parts by mass) | A | Binary copolymer 1 | 100.0 | 100.0 | 100.0 | — | — | 100.0 |
| | | | Ternary copolymer 1 | — | — | — | 100.0 | 100.0 | — |
| | | | Binary copolymer 2 | — | — | — | — | — | — |
| | | B | Rap dGO (graphene oxide) | 20.0 | 20.0 | 20.0 | 10.0 | 20.0 | — |
| | | C | Oleyl betaine | 60.0 | 60.0 | 60.0 | 60.0 | 30.0 | 60.0 |
| | | D | Oleic acid | 90.0 | 90.0 | 90.0 | 90.0 | — | 90.0 |
| | | E | Magnesium hydroxide | 4.7 | 10.5 | 33.7 | 14.4 | 5.3 | 18.2 |
| | | | Sodium hydroxide | — | — | — | — | — | — |
| | | | Zinc oxide | — | — | — | — | — | — |
| | | | Calcium hydroxide | — | — | — | — | — | — |
| | Properties | | Equivalence ratio | 0.50 | 0.80 | 2.00 | 1.20 | 1.50 | 1.20 |
| | | | Slab hardness (Shore D) | 50 | 51 | 54 | 56 | 52 | 46 |
| | | | Bending stiffness $M_{3-12}$ (kgf/cm$^2$) | 2239 | 2113 | 3312 | 1837 | 1894 | 510 |

TABLE 8-continued

| Golf ball No. | | 3-14 | 3-15 | 3-16 | 3-17 | 3-18 | 5-2 |
|---|---|---|---|---|---|---|---|
| | Bending stiffness $M_{24-30}$ (kgf/cm$^2$) | 1975 | 1982 | 2983 | 1683 | 1539 | 479 |
| | $M_{3-12}/M_{24-30}$ | 1.13 | 1.07 | 1.11 | 1.09 | 1.23 | 1.06 |
| | Melt flow rate (g/10 min) (190° C., 2.16 kgf) | 3.6 | 2.9 | 1.3 | 4.4 | 1.9 | 2.3 |
| Ball | Compression deformation amount (mm) | 3.6 | 3.4 | 3.1 | 2.8 | 3.6 | 3.8 |
| evaluation | Coefficient of Restitution | 0.804 | 0.812 | 0.834 | 0.784 | 0.773 | 0.628 |
| | Shot feeling | E | E | E | G | E | E |

Binary copolymer 1: ethylene-methacrylic acid copolymer (methacrylic acid content: 15 mass %, MFR (190° C., 2.16 kgf): 60 g/10 min, bending stiffness: 81 MPa)
Ternary copolymer 1: ethylene-methacrylic acid-butyl methacrylate copolymer (methacrylic acid content: 8 mass %, MFR (190° C. 2.16 kgf) 55 g/10 min, bending stiffness: 184 MPa)
Binary copolymer 2: ethylene-methacrylic acid copolymer (methacrylic acid content: 20 mass %. MFR (190° C., 2.16 kgf): 60 g/10 min, bending stiffness: 109 MPa)
VGCF-H: carbon nanotube (average diameter in the transverse direction: 0.15 μm, average length in the longitudinal direction: 7 μm, average aspect ratio: 46.7) manufactured by Showa Denko K.K.
TISMO D: potassium titanate (average diameter in the transverse direction 0.3 μm, average length in the longitudinal direction: 15 μm, average aspect ratio: 50) manufactured by Otsuka Chemical Co., Ltd.
Celasule (registered trademark) BMI: needle-like alumina (average diameter in the transverse direction: 0.13 μm, average length in the longitudinal direction: 5 μm, average aspect ratio: 38.5) manufactured by Kawai Lime Industry Co. Ltd. PCF7620A: surface organically treated aluminum powder (average diameter in the transverse direction: 0.3 μm, average length in the longitudinal direction: 18 μm, average aspect ratio: 60, coating agent: polymer composed of (meth)acrylic acid and/or (meth)acrylic acid derivate, surface functional group content: from 40 μg/g to 150 μg/g) manufactured by Toyo Aluminium K.K.
Aluminum powder: manufactured by Sigma-Aldrich Japan K.K (particle diameter: 110 μm)
Neutral alumina powder: manufactured by Wako Pure Chemical Industries. Ltd (particle diameter: from 32 μm to 63 μm)
Silica powder: SNOWTEX (registered trademark) OXS (particle diameter: from 4 nm to 6 nm) manufactured by Nissan Chemical Industries, Ltd.
Sulfonic acid modified fullerene: manufactured according to the conventional method (product in which one molecule of fullerene is modified with four to five sulfo groups)
Graphite powder: SG-BH8 (average short diameter: 8 μm, average long diameter 15 μm, average aspect ratio: 1.9) manufactured by Ito Graphite Co., Ltd.
Oleyl betaine: purified product of "Chembetaine OL" (oleyldimethylaminoacetic acid betaine) (water and salt are removed) manufactured by The Lubrizol Corporation
Oleic acid: manufactured by Tokyo Chemical Industry Co., Ltd.
Magnesium hydroxide: manufactured by Wako Pure Chemical Industries, Ltd.
Sodium hydroxide: manufactured by Wako Pure Chemical Industries, Ltd.
Zinc oxide: manufactured by Sigma-Aldrich Corporation
Calcium hydroxide: manufactured by Tokyo Chemical Industry Co., Ltd.

(3) Production of Cover 4 parts by mass of titanium oxide (A220 manufactured by Ishihara Sangyo Kaisha, Ltd.) was added into 100 parts by mass of a thermoplastic polyurethane elastomer (Elastollan (registered trademark) XNY85A manufactured by BASF Japan Ltd.), followed by mixing with a twin-screw kneading extruder to prepare a cover composition in a pellet form. Extrusion of the cover composition was performed in the following conditions: screw diameter: 45 mm, screw revolutions: 200 rpm; and screw L/D=35. The blended material was heated to a temperature in a range from 160° C. to 230° C. at the die position of the extruder.

When molding the cover, the hold pin was protruded to hold the spherical body on which the intermediate layer has been formed, and the cover composition heated to 260° C. was charged into a mold held under the pressure of 80 ton for 0.3 second. After cooling for 30 seconds, the mold was opened and the golf ball was ejected from the mold. The surface of the obtained golf ball body was treated with sandblast, marked, and painted with a clear paint. The paint was dried in an oven at 40° C. to obtain the golf ball with a diameter of 42.8 mm and a mass of 45.4 g.

Figure 3:
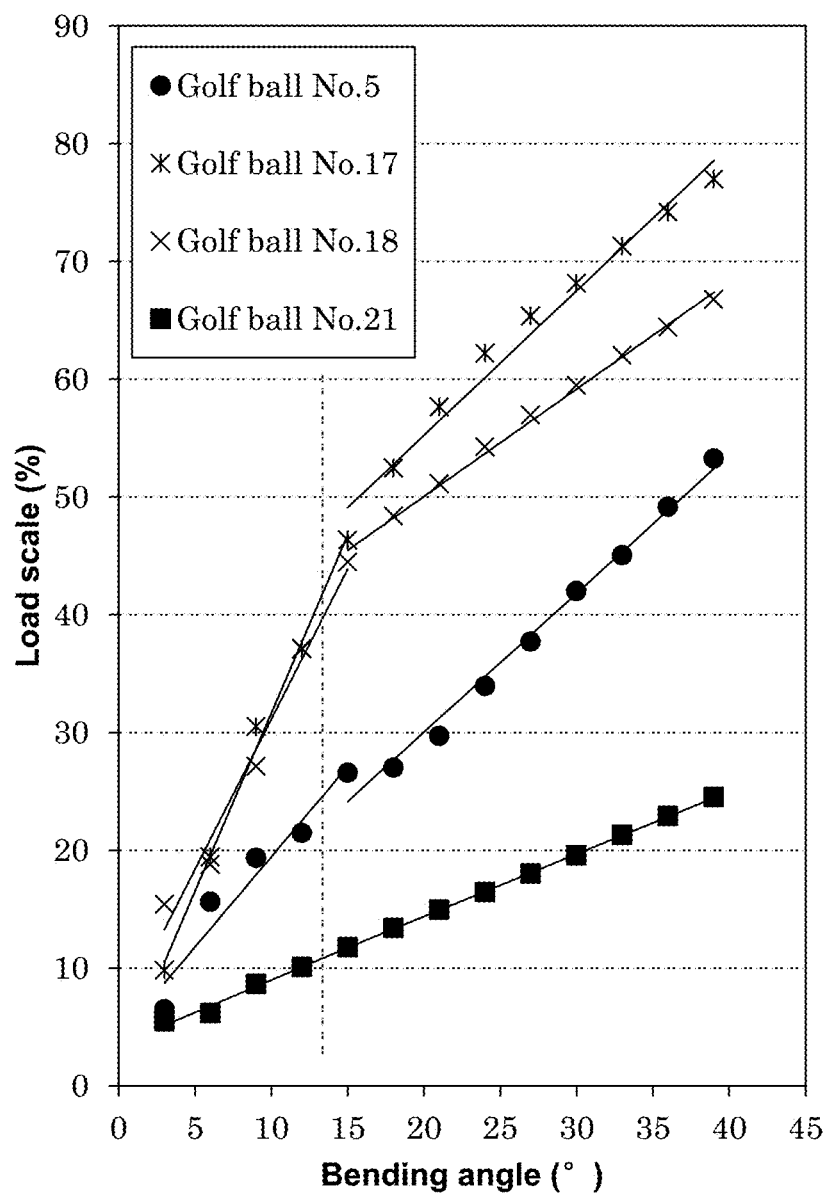
FIG. 3 is a graph showing a relationship between bending angle and load scale.

The properties of the golf ball resin compositions used for the golf balls are shown in Tables 2 to 3. The relationship between the bending angle and load scale of the golf ball resin compositions used for Golf balls No. 1-5, 4-1, 4-2 and 5-1 is shown in FIG. 3. As shown in FIG. 3, in the case of comprising a silica powder or graphite powder (Golf balls No. 4-1 and 4-2), the slope of approximation curve is large in a range where the bending angle is 15° or less, however, the slope of approximation curve becomes small if the bending angle exceeds 15°. In other words, Golf balls No. 4-1 and 4-2 exhibit high bending stiffness in the region where the bending angle is small, but exhibit inferior bending stiffness in the region where the bending angle is large.

On the contrary, in the case of comprising (B) a needle-like or fibrous filler (Golf ball No. 1-5), the slope of approximation curve is nearly constant in a range where the bending angle is from 3° to 39°. Furthermore, the resin composition comprising (B) the needle-like or fibrous filler (Golf ball No. 1-5) exhibits a larger slope of approximation curve than the resin composition not comprising a filler (Golf ball No. 5-1). In other words, if (B) the needle-like or fibrous filler is comprised, the resultant resin composition exhibits an improved bending stiffness, and can retain high stiffness even in the region where the bending angle is large.

Figure 4:
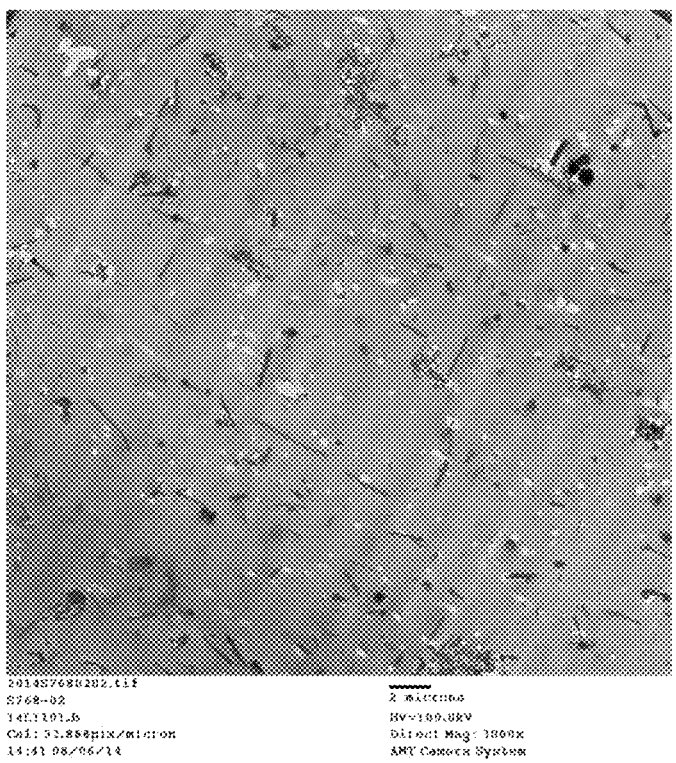
FIG. 4 is a drawing substitute photograph showing an electron microscope image of a golf ball resin composition used in an inventive example Golf ball No. 1-2.
Figure 5:
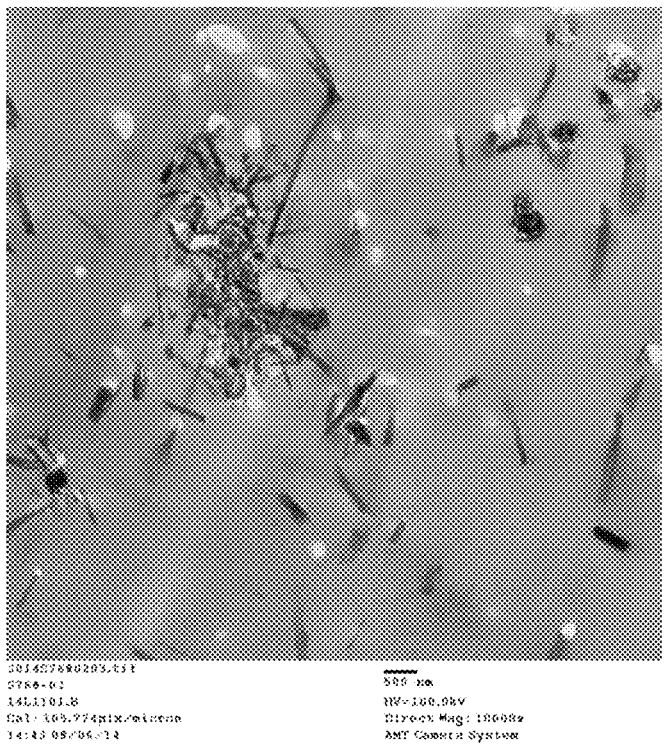
FIG. 5 is a drawing substitute photograph showing an enlarged image of an aggregate shown in FIG. 4.

The electron microscope photographs of a slab prepared from the golf ball resin composition used in Golf ball No. 1-2 are shown in FIG. 4 and FIG. 5. As shown in FIG. 4 and FIG. 5, it is confirmed that (B) the needle-like or fibrous filler forms an aggregate.

The evaluation results for the obtained test golf balls are shown in Tab. 2 to Tab. 8. It is apparent from the results shown in Tab. 2 to Tab. 8 that, the golf balls formed from a golf ball resin composition, wherein the golf ball resin composition has a bending stiffness ($M_{3-12}$) ranging from 300 kgf/cm$^2$ to 24,000 kgf/cm$^2$ at a bending angle from 3° to 12°, a ratio ($M_{3-12}/M_{24-30}$) of the bending stiffness ($M_{3-12}$) at the bending angle from 3° to 12° to a bending stiffness ($M_{24-30}$) at a bending angle from 24° to 30° ranging from 0.20 to 2.00, and a slab hardness ranging from 30 to 65 in Shore D hardness, exhibit good shot feeling and excellent resilience (each of them has coefficient of restitution of higher than 0.8).

Golf balls No. 3-1 to No. 3-18 are the cases where the intermediate layer thereof is formed from a resin composition comprising a binary ionomer resin or ternary ionomer resin and (b-3) a carbonaceous filler. These golf balls exhibit highly improved resilience and more excellent shot feeling than Golf ball No. 5-2 formed from a resin composition not comprising a filler. Golf balls No. 4-1 to No. 4-6 are the cases where the intermediate layer thereof is formed from a resin composition comprising another filler. These golf balls exhibit small resilience improvement effect and inferior shot feeling compared to Golf ball No. 5-2.

The golf ball according to the present invention exhibits an excellent shot feeling and resilience. This application is based on Japanese Patent Applications No. 2014-135410 filed on Jun. 30, 2014, No. 2014-135411 filed on Jun. 30, 2014, No. 2014-266655 filed on Dec. 26, 2014, No. 2015-103870 filed on May 21, 2015, and No. 2015-103871 filed on May 21, 2015, the contents of which are hereby incorporated by reference.

The invention claimed is:

1. A golf ball resin composition comprising (A) a thermoplastic resin, (B) a filler, (C) an amphoteric surfactant, and (D) a fatty acid,
   wherein (B) the filler is at least one selected from the group consisting of
   (b-1) a needle-like or fibrous filler having an average diameter ranging from 0.02 μm to 0.3 μm in the transverse direction thereof, an average length ranging from 3 μm to 50 μm in the longitudinal direction thereof, and an average aspect ratio ranging from 10 to 2,500,
   (b-2) a metal filler obtained by treating the surface of at least one metal selected from the group consisting of aluminum, titanium, zinc, chromium, iron, nickel, tin, and copper, with a polymer composed of an α,β-unsaturated carboxylic acid and/or a derivate thereof, and
   (b-3) a carbonaceous filler having a polar functional group on the surface thereof, and having an average short diameter ranging from 0.1 μm to 100 μm, an average long diameter ranging from 0.2 μm to 300 μm, an average aspect ratio ranging from 2.0 to 1,000, and an average thickness ranging from 0.3 nm to 50 nm.

2. The golf ball resin composition according to claim 1, wherein (B) the filler is (b-1) the needle-like or fibrous filler, and
   (b-1) the needle-like or fibrous filler is at least one material selected from the group consisting of wallastonite, potassium titanate, xonotlite, gypsum, aluminum borate, molybdenum disulfide, aramid, zinc oxide, crystalline cellulose, silica, alumina, carbon, glass, mica, and polyoxybenzoyl.

3. The golf ball resin composition according to claim 2, wherein the golf ball resin composition contains (b-1) the needle-like or fibrous filler in an amount ranging from 1 part by mass to 25 parts by mass with respect to 100 parts by mass of (A) the thermoplastic resin.

4. The golf ball resin composition according to claim 1, wherein (A) the thermoplastic resin comprises a metal ion-neutralized product of a binary copolymer composed of an olefin and an α,β-unsaturated carboxylic acid having 3 to 8 carbon atoms, and/or a metal ion-neutralized product of a ternary copolymer composed of an olefin, an α,β-unsaturated carboxylic acid having 3 to 8 carbon atoms and an α,β-unsaturated carboxylic acid ester.

5. The golf ball resin composition according to claim 4, wherein (A) the thermoplastic resin is an ionomer resin neutralized with at least one metal ion selected from the group consisting of $Na^+$, $Mg^{2+}$, $Ca^{2+}$, and $Zn^{2+}$.

6. The golf ball resin composition according to claim 1, wherein (C) the amphoteric surfactant is at least one selected from the group consisting of a betaine type amphoteric surfactant, sulfobetaine type amphoteric surfactant, phosphobetaine type amphoteric surfactant, β-alanine type amphoteric surfactant, glycine type amphoteric surfactant, alkylamine oxide type amphoteric surfactant, alkylamino fatty acid salt type amphoteric surfactant, and amidoamino acid type amphoteric surfactant.

7. The golf ball resin composition according to claim 1, wherein the golf ball resin composition contains (C) the amphoteric surfactant in an amount ranging from 1 part by mass to 200 parts by mass with respect to 100 parts by mass of (A) the thermoplastic resin.

8. The golf ball resin composition according to claim 1, wherein (D) the fatty acid is at least one selected from the group consisting of heptanoic acid, octanoic acid, dodecanoic acid, pentadecanoic acid, hexadecanoic acid, octadecanoic acid, icosanoic acid, docosanoic acid, octacosanoic acid, octadecenoic acid, octadecadienoic acid, icosenoic acid, oleic acid, linoleic acid, and arachidic acid.

9. The golf ball resin composition according to claim 1, wherein the golf ball resin composition contains (D) the fatty acid in an amount ranging from 1 part by mass to 200 parts by mass with respect to 100 parts by mass of (A) the thermoplastic resin.

10. The golf ball resin composition according to claim 1, wherein the golf ball resin composition further contains (E) a metal compound.

11. The golf ball resin composition according to claim 1, wherein the golf ball resin composition has a bending stiffness ($M_{3-12}$) ranging from 300 kgf/cm² to 24,000 kgf/cm² at a bending angle from 3° to 12°, a ratio ($M_{3-12}/M_{24-30}$) of the bending stiffness ($M_{3-12}$) at the bending angle from 3° to 12° to a bending stiffness ($M_{24-30}$) at a bending angle from 24° to 30° ranging from 0.20 to 2.00, and a slab hardness ranging from 30 to 65 in Shore D hardness.

12. The golf ball resin composition according to claim 11, wherein the golf ball resin composition has a ratio ($M_{12-15}/M_{36-39}$) of a bending stiffness ($M_{12-15}$) at a bending angle from 12° to 15° to a bending stiffness ($M_{36-39}$) at a bending angle from 36° to 39° ranging from 0.20 to 2.00.

13. The golf ball resin composition according to claim 1, wherein (A) the thermoplastic resin comprises a metal ion-neutralized product of a binary copolymer composed of an olefin and an α,β-unsaturated carboxylic acid having 3 to 8 carbon atoms, and/or a metal ion-neutralized product of a ternary copolymer composed of an olefin, an α,β-unsaturated carboxylic acid having 3 to 8 carbon atoms and an α,β-unsaturated carboxylic acid ester,
   (B) the filler is at least one selected from the group consisting of
   (b-1) a needle-like or fibrous filler having an average diameter ranging from 0.02 μm to 0.3 μm in the transverse direction thereof, an average length ranging from 3 μm to 50 μm in the longitudinal direction thereof, and an average aspect ratio ranging from 10 to 2,500, (b-2) a metal filler obtained by treating the surface of at least one metal selected from the group consisting of aluminum, titanium, zinc, chromium, iron, nickel, tin, and copper, with a polymer composed of an α,β-unsaturated carboxylic acid and/or a derivate thereof, and (b-3) a carbonaceous filler having a polar functional group on the surface thereof, and having an average short diameter ranging from 0.1 µm to 100 µm, an average long diameter ranging from 0.2 µm to 300 µm, an average aspect ratio ranging from 2.0 to 1,000, and an average thickness ranging from 0.3 nm to 50 nm, (C) the amphoteric surfactant is at least one selected from the group consisting of a betaine type amphoteric surfactant, sulfobetaine type amphoteric surfactant, phosphobetaine type amphoteric surfactant, β-alanine type amphoteric surfactant, glycine type amphoteric surfactant, alkylamine oxide type amphoteric surfactant, alkylamino fatty acid salt type amphoteric surfactant, and amidoamino acid type amphoteric surfactant, and (D) the fatty acid is at least one selected from the group consisting of heptanoic acid, octanoic acid, dodecanoic acid, pentadecanoic acid, hexadecanoic acid, octadecanoic acid, icosanoic acid, docosanoic acid, octacosanoic acid, octadecenoic acid, octadecadienoic acid, icosenoic acid, oleic acid, linoleic acid, and arachidic acid.

14. The golf ball resin composition according to claim 13, wherein the golf ball resin composition has
    a bending stiffness ($M_{3-12}$) ranging from 300 kgf/cm² to 24,000 kgf/cm² at a bending angle from 3° to 12°,
    a ratio ($M_{3-12}/M_{24-30}$) of the bending stiffness ($M_{3-12}$) at the bending angle from 3° to 12° to a bending stiffness ($M_{24-30}$) at a bending angle from 24° to 30° ranging from 0.20 to 2.00,
    a ratio ($M_{12-15}/M_{36-39}$) of a bending stiffness ($M_{12-15}$) at a bending angle from 12° to 15° to a bending stiffness ($M_{36-39}$) at a bending angle from 36° to 39° ranging from 0.20 to 2.00, and
    a slab hardness ranging from 30 to 65 in Shore D hardness.

15. The golf ball resin composition according to claim 14, wherein (B) the filler is (b-1) the needle-like or fibrous filler, and
    (b-1) the needle-like or fibrous filler is at least one material selected from the group consisting of wallastonite, potassium titanate, xonotlite, gypsum, aluminum borate, molybdenum disulfide, aramid, zinc oxide, crystalline cellulose, silica, alumina, carbon, glass, mica, and polyoxybenzoyl.

16. The golf ball resin composition according to claim 1, wherein (B) the filler is (b-2) the surface organically treated metal filler, and (b-2) the surface organically treated metal filler has an average diameter ranging from 0.1 µm to 200 µm in the transverse direction thereof, an average length ranging from 0.5 µm to 300 µm in the longitudinal direction thereof, and an average aspect ratio ranging from 1.5 to 3,000.

17. The golf ball resin composition according to claim 16, wherein (b-2) the surface organically treated metal filler has a polar functional group on the surface thereof,
    the polar functional group is at least one selected from the group consisting of carboxyl group, hydroxyl group, amino group, thiol group, sulfo group, and phosphonic acid group, and
    a content of the polar functional group ranges from 0.2 µg/g to 300 µg/g per unit mass of
    (b-2) the surface organically treated metal filler.

18. The golf ball resin composition according to claim 1, wherein
    (B) the filler is (b-3) the carbonaceous filler, and
    (b-3) the carbonaceous filler is graphene and/or a graphite flake.

19. The golf ball resin composition according to claim 18, wherein the polar functional group on the surface of (b-3) the carbonaceous filler is at least one selected from the group consisting of carboxyl group, hydroxyl group, amino group, thiol group, sulfo group, and phosphonic acid group, and
    a content of the polar functional group ranges from 0.3 mmol/g to 5.0 mmol/g per unit mass of (b-3) the carbonaceous filler.

20. A golf ball comprising a constituent member formed from a golf ball resin composition, wherein the golf ball resin composition comprises (A) a thermoplastic resin, (B) a filler, (C) an amphoteric surfactant, and (D) a fatty acid,
    wherein (B) the filler is at least one selected from the group consisting of
    (b-1) a needle-like or fibrous filler having an average diameter ranging from 0.02 µm to 0.3 µm in the transverse direction thereof, an average length ranging from 3 µm to 50 µm in the longitudinal direction thereof, and an average aspect ratio ranging from 10 to 2,500,
    (b-2) a metal filler obtained by treating the surface of at least one metal selected from the group consisting of aluminum, titanium, zinc, chromium, iron, nickel, tin, and copper, with a polymer composed of an α,β-unsaturated carboxylic acid and/or a derivate thereof, and
    (b-3) a carbonaceous filler having a polar functional group on the surface thereof, and having an average short diameter ranging from 0.1 µm to 100 µm, an average long diameter ranging from 0.2 µm to 300 µm, an average aspect ratio ranging from 2.0 to 1,000, and an average thickness ranging from 0.3 nm to 50 nm.

* * * * *